US006580355B1

(12) United States Patent
Milo

(10) Patent No.: US 6,580,355 B1
(45) Date of Patent: Jun. 17, 2003

(54) REMOTE DOOR ENTRY SYSTEM

(75) Inventor: Thomas K. Milo, Akron, OH (US)

(73) Assignee: T.K.M. Unlimited, Inc., Akron, OH (US)

(*) Notice: Subject to any disclaimer, the term of this patent is extended or adjusted under 35 U.S.C. 154(b) by 0 days.

(21) Appl. No.: 09/330,962

(22) Filed: Jun. 11, 1999

(51) Int. Cl.[7] ........................... H04Q 9/00; E05B 47/00

(52) U.S. Cl. ........................... 340/5.7; 70/280; 70/277

(58) Field of Search ........................... 340/5.64, 5.7, 340/825.72, 546; 292/254, 255, 341.16, 341.17, 39, 40, 144; 70/278.1, 278, 277, 303, 278.6, 280, 281, 282, 330, 153

(56) References Cited

U.S. PATENT DOCUMENTS

| | | | | |
|---|---|---|---|---|
| 508,518 A | | 11/1893 | Johnson | |
| 3,196,440 A | | 7/1965 | Weinstein | 343/225 |
| 3,733,861 A | | 5/1973 | Lester | 70/153 |
| 3,792,885 A | * | 2/1974 | Giardina et al. | 292/39 |
| 3,893,723 A | | 7/1975 | Boule | 292/140 |
| 3,953,991 A | | 5/1976 | Grossman | 70/104 |
| 4,225,164 A | | 9/1980 | Wensley et al. | 292/33 |
| 4,286,305 A | | 8/1981 | Pilat et al. | 361/172 |
| 4,355,830 A | | 10/1982 | Rau, III | 292/144 |
| 4,372,594 A | | 2/1983 | Gater | 292/337 |
| 4,446,707 A | | 5/1984 | Mullich et al. | 70/134 |
| 4,468,059 A | | 8/1984 | Nelson et al. | 292/337 |
| 4,470,278 A | | 9/1984 | Hale et al. | 70/134 |
| 4,564,229 A | | 1/1986 | Mullich et al. | 292/169.13 |
| 4,568,998 A | | 2/1986 | Kristy | 361/172 |
| 4,593,542 A | | 6/1986 | Rotondi et al. | 70/134 |
| 4,593,543 A | | 6/1986 | Stefanek | 70/134 |
| 4,596,985 A | | 6/1986 | Bongard et al. | 340/825.69 |
| 4,602,490 A | | 7/1986 | Glass et al. | 70/134 |
| 4,615,549 A | | 10/1986 | Couture | 292/169.21 |
| 4,633,688 A | | 1/1987 | Beudat et al. | 70/279 |
| 4,639,025 A | | 1/1987 | Fann et al. | 292/337 |
| 4,656,849 A | | 4/1987 | Rotondi et al. | 70/134 |
| 4,664,433 A | | 5/1987 | Solovieff | 292/337 |
| 4,679,834 A | | 7/1987 | Gotanda | 292/169.13 |
| 4,686,529 A | | 8/1987 | Kleefeldt | 340/825.69 |
| 4,708,379 A | | 11/1987 | Ching | 292/337 |
| 4,725,086 A | | 2/1988 | Shen | 292/337 |
| 4,729,586 A | | 3/1988 | Fang | 292/337 |
| 4,752,090 A | | 6/1988 | Lin | 292/1 |
| 4,759,576 A | | 7/1988 | Ching | 292/337 |
| 4,772,055 A | | 9/1988 | Fang | 292/337 |
| 4,834,432 A | | 5/1989 | Smallegan et al. | 292/169.21 |
| 4,840,412 A | | 6/1989 | Shen | 292/337 |
| 4,840,413 A | | 6/1989 | Shen | 292/337 |
| 4,895,404 A | | 1/1990 | Toledano | 292/337 |
| 4,902,057 A | | 2/1990 | Ching | 292/337 |
| 4,921,290 A | | 5/1990 | Dietrich | 292/337 |
| 4,929,003 A | | 5/1990 | McConnell | 292/144 |
| 4,950,008 A | | 8/1990 | Fang | 292/337 |
| 4,957,315 A | | 9/1990 | Lin | 292/337 |
| 4,979,768 A | | 12/1990 | Marotto et al. | 292/337 |
| 5,109,221 A | | 4/1992 | Lambropoulos et al. | 340/825.69 |

(List continued on next page.)

FOREIGN PATENT DOCUMENTS

| | | |
|---|---|---|
| CA | 2 103 005 | 2/1995 |
| EP | 0 468 222 | 1/1992 |
| FR | 2 696 493 | 4/1994 |

OTHER PUBLICATIONS

US 5,525,973, 6/1996, Andreou et al. (withdrawn).
European International Search Report dated Jun. 5, 2001.

*Primary Examiner*—Michael Horabik
*Assistant Examiner*—William Bangachon
(74) *Attorney, Agent, or Firm*—Fay, Sharpe, Fagan, Minnich & McKee, LLP

(57) ABSTRACT

A remote control door entry system, which may be installed in a door jamb/frame, in the center frame post of a door assembly that has a side light glass unit, or centered in the edge of the stationary door of a double door arrangement. The slim design of the present invention contributes to its significant versatility.

33 Claims, 15 Drawing Sheets

U.S. PATENT DOCUMENTS

| | | | | | |
|---|---|---|---|---|---|
| 5,115,236 | A | | 5/1992 | Kohler | 340/825.69 |
| 5,149,151 | A | | 9/1992 | Shen | 292/1.5 |
| 5,152,558 | A | | 10/1992 | Smith et al. | 292/1.5 |
| 5,252,966 | A | | 10/1993 | Lambropoulos et al. | 340/825.69 |
| 5,386,713 | A | | 2/1995 | Wilson | 70/280 |
| 5,412,379 | A | | 5/1995 | Waraksa et al. | 340/825.72 |
| 5,420,925 | A | | 5/1995 | Michaels | 380/23 |
| 5,437,174 | A | | 8/1995 | Aydin | 70/278 |
| 5,474,342 | A | * | 12/1995 | Smith et al. | 292/254 |
| 5,531,086 | A | | 7/1996 | Bryant | 70/279 |
| 5,562,314 | A | | 10/1996 | Wheatland et al. | 292/1.5 |
| 5,583,485 | A | | 12/1996 | Van Lente et al. | 340/525 |
| 5,600,324 | A | | 2/1997 | Reed et al. | 341/176 |
| 5,626,039 | A | | 5/1997 | Solari et al. | 70/279 |
| 5,678,436 | A | | 10/1997 | Alexander | 70/278 |
| 5,684,471 | A | | 11/1997 | Bernardi et al. | 340/825.72 |
| 5,712,626 | A | | 1/1998 | Andreou et al. | 340/825.31 |
| 5,729,198 | A | | 3/1998 | Gorman | 340/539 |
| 5,790,034 | A | * | 8/1998 | Khoury | 340/574 |
| 5,862,692 | A | * | 1/1999 | Legault et al. | 70/278 |
| 5,911,460 | A | * | 6/1999 | Hawkins et al. | 292/254 |
| 6,022,056 | A | | 2/2000 | Cope et al. | 292/144 |

* cited by examiner

REMOTE DOOR ENTRY SYSTEM

FIELD OF INVENTION

The present invention generally relates to a door entry system, and more particularly to a door entry system capable of remote control operation.

BACKGROUND OF THE INVENTION

There is a need for reliable security in many places, including homes and offices. One of the most significant components of this security are door locks. Existing door lock systems which provide enhanced security to existing door latches and locks, and/or provide a system for remote control, have drawbacks which significantly affect their utility. In this regard, existing door lock systems are often designed in a manner which is incompatible with existing door latch and lock hardware, or requires significant modification to existing door latches and locks and/or the region surrounding the existing door latches and locks. Another drawback are the difficulties and complexities encountered to install prior art door lock systems. The present invention addresses these and other drawbacks to provide a remote door entry system which is versatile, convenient to use and install, and which is adapted for use in connection with existing door latch and door lock hardware.

SUMMARY OF THE INVENTION

According to the present invention there is provided a door entry system comprising: a first lock assembly including: (a) first housing means for housing said first lock assembly, (b) first and second slide members, wherein said first and second slide members move in opposite directions, and (c) motor means for moving each of said first and second slide members between respective extended and retracted positions; and control means for controlling operation of the door entry system.

According to another aspect of the present invention there is provided a door entry system comprising: control means for controlling operation of the door entry system, and a deadbolt assembly including: (a) deadbolt housing means for housing said deadbolt assembly, (b) a deadbolt member movable between an extended and retracted position, wherein said deadbolt member includes switch means for conveying a signal to the control means to move said deadbolt member to a retracted position, when said switch means is activated, and (c) motor means for moving the deadbolt member between the extended and retracted positions.

An advantage of the present invention is the provision of a remote door entry system which has compact dimensions.

Another advantage of the present invention is the provision of a remote door entry system which may be conveniently located an area having limited space.

Another advantage of the present invention is the provision of a remote door entry system that is concealed from view.

Still another advantage of the present invention is the provision of a remote door entry system that provides enhanced security.

Still another advantage of the present invention is the provision of a remote door entry system that is tamper resistant.

Still another advantage of the present invention is the provision of a remote door entry system which can be conveniently operated via a compact remote control unit.

Still another advantage of the present invention is the provision of a remote door entry system which may be operated in connection with an associated alarm system.

Still another advantage of the present invention is the provision of a remote door entry system which does not require internal or external wiring for providing power thereto.

Yet another advantage of the present invention is the provision of a remote door entry system which may be battery powered and/or hardwired.

Yet another advantage of the present invention is the provision of a remote door entry system which is adapted for use with existing spring latch bolt and dead latch bolt door handle assemblies.

Yet another advantage of the present invention is the provision of a remote door entry system which is conveniently configured with a sliding bolt arrangement, and/or sliding battery unit, or any combination thereof.

Yet another advantage of the present invention is the provision of a remote door entry system which is easily adapted for use with either a right-hand door handle assembly or a left-hand door handle assembly.

Yet another advantage of the present invention is the provision of a remote door entry system which may be configured with or without a motorized deadbolt assembly. Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1A:
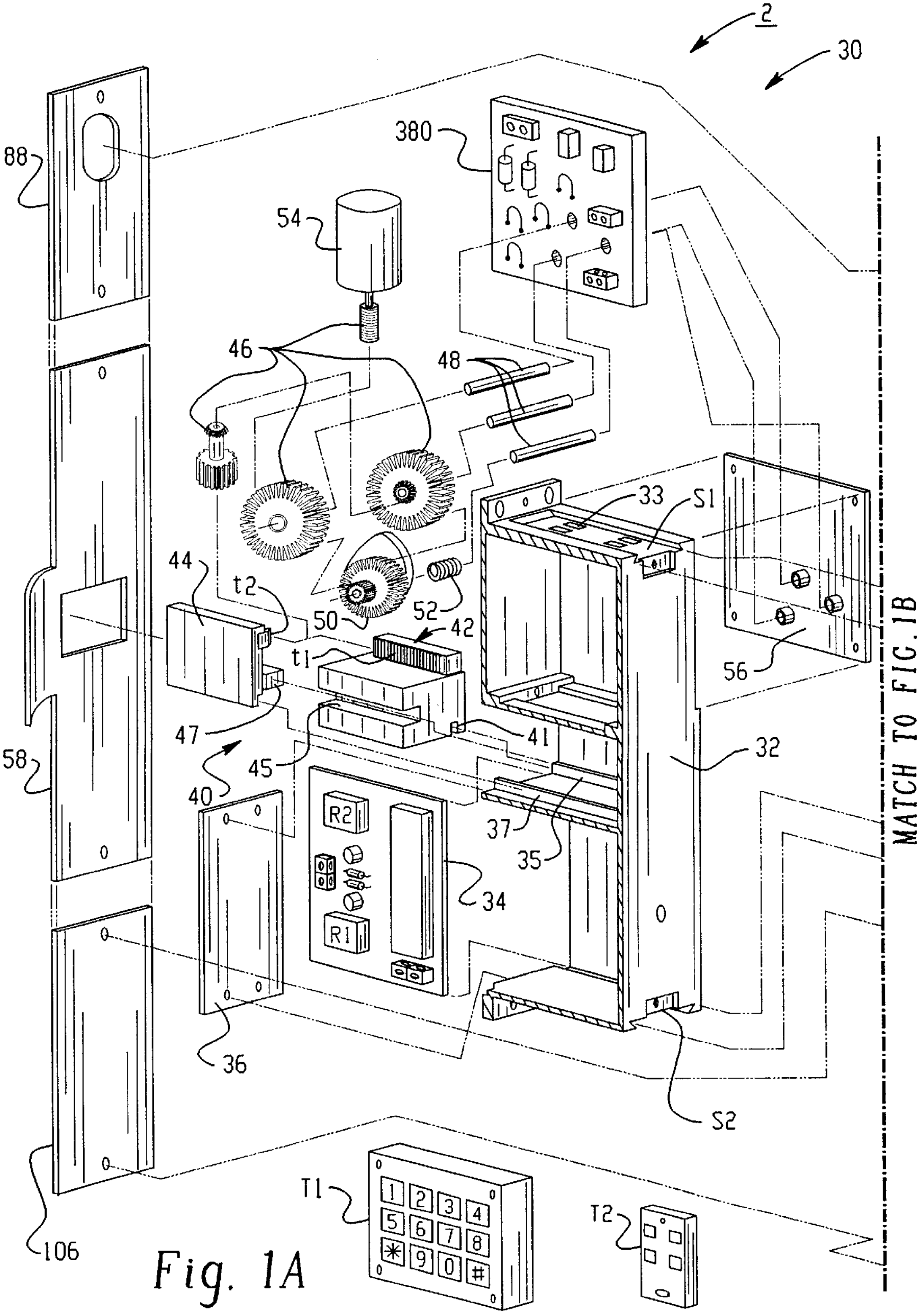
FIGS. 1A and 1B provide an exploded view of a door entry system according to a preferred embodiment of the present invention.
Figure 1B:
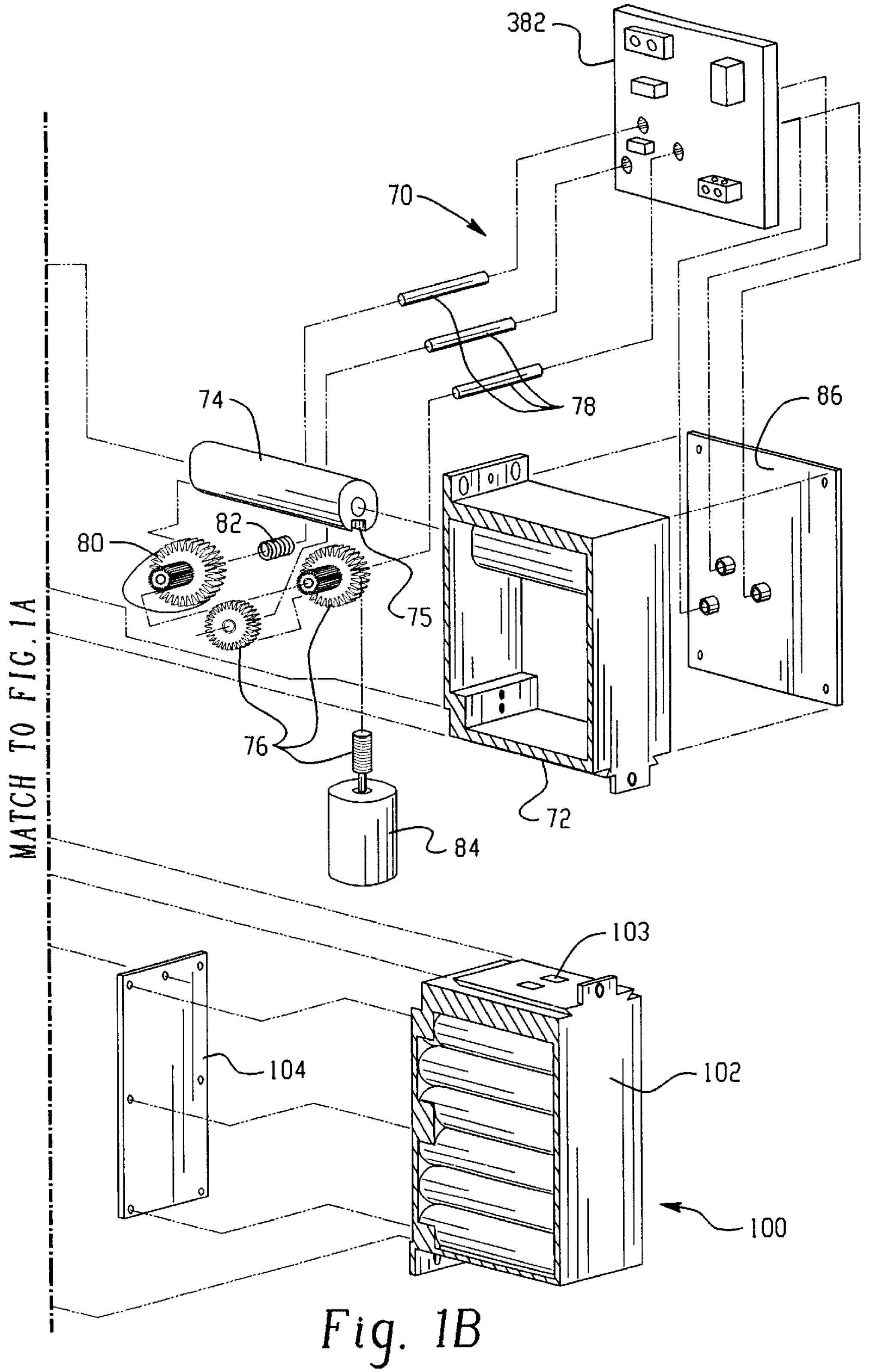

Referring now to the drawings wherein the showings are for the purposes of illustrating a preferred embodiment of the invention only and not for purposes of limiting same, FIGS. 1A and 1B show an exploded view of a door entry system 2, according to a preferred embodiment of the present invention. Door entry system 2 is generally comprised of a primary lock assembly 30, a deadbolt assembly 70, a battery unit 100, and a cable bracket electrical interface assembly 120 (see FIG. 2A). Assemblies 30, 70, 100 and 120 will each be described in detail below.

Primary lock assembly 30 includes a housing 32, which houses two electronic control boards 34 and 380, and a sliding bolt assembly 40 (described below). A pair of guide rails 35, 37 are provided in housing 32 for guiding slide bolts of sliding bolt assembly 40, as will be explained below. Housing 32 has slots SI and S2, respectively formed at the upper and lower surfaces thereof. Electrical contacts 33 are arranged inside slots S1 and S2 to provide a convenient means for electrically connecting electrical components housed in housing 32 to an electrical power source, and communicating data between the system components. It should be understood that the electrical contacts in slot S1 are in electrical connection with electrical contacts in slot S2, via system components. The connection with the electrical power source will be described in detail below. Several cover plates 36, 56 and 86 seal electronics boards 34, 380 and 382 within housings 32 and 72. Electronic controls are arranged on electronic control boards 34, 380 and 382, which control operation of primary lock assembly 30 and deadbolt assembly 70. In this respect, the electronic controls receive operator instructions, and control assemblies 30 and 70 to lock and unlock a door. The electronic controls of the present invention will be described in further detail below.

In one embodiment of the present invention, primary lock assembly 30 comprises a sliding bolt assembly 40, which includes a first slide bolt 42, a second slide bolt 44, a primary gear set 46, primary gear pins 48, a primary gear cam clutch 50 and associated gear clutch spring 52, a DC motor 54, electronic board 380, and a gear box cover plate 56. First slide bolt 42 includes a teeth portion t1, a lower slot 41 and a lateral slot 45. Second slide bolt 44 includes a teeth portion t2 and a guide rail portion 47. Guide rail portion 47 is dimensioned to slide within lateral slot 45. Lower slot 41 of first slide bolt 42 is dimensioned to receive guide rail 35. When rail portion 47 is received with lateral slot 45, another lower slot is formed which is dimensioned to receive guide rail 37. In this manner, Motor 54 drives gear set 46, which in turn modifies the position of slide bolts 42 and 44 by engagement with teeth portions T1 and t2. It should be understood that in accordance with a preferred embodiment of the present invention, teeth portions t1 and t2 take the form of gear racks. The gears of gear set 46 are mounted to gear pins 48. Gear cam clutch 50 and gear clutch spring 52 are provided to prevent gear set 46 from binding or being damaged if slide bolts 42, 44 or the gear set 46 become bound. Importantly, first slide bolt 42 and second slide bolt 44 move in opposite directions, as they are move between an “unlocked” position and a “locked” position. It should be noted that gear cam clutch 50 has a cam portion which is used to trip limit switches located on electronic board 380. These limit switches are used to limit the travel of sliding bolts 42, 44, and deadbolt block 64. The operation of sliding bolt assembly 40 will be described in greater detail below.

It should be appreciated that in an alternative embodiment of the present invention, first slide bolt 42 and second slide bolt 44 may be replaced with a deadbolt block 64 (FIG. 2), where only a deadbolt is desired. Deadbolt block 64 includes a teeth portion T3, a bolt portion 66 and a pair of lower slots 65 and 67. Slots 65 and 67 are dimensioned to receive guide rails 35 and 37 of housing 32. A gear of gear set 46 engages with teeth portion T3 to modify the position of deadbolt block 64. In accordance with a preferred embodiment, teeth portion T3 takes the form of a gear rack. A modified strike plate 58' is used with deadbolt block 64. When sliding bolt assembly 40 is activated to a locked position, deadbolt block 64 moves to an extended position, and protrudes into a door, door jamb/frame, center frame post or the like, to prevent the associated door from being opened.

Deadbolt assembly 70 includes a housing 72, a bolt 74, a deadbolt gear set 76, deadbolt gear pins 78, a deadbolt gear cam clutch 80 and associated gear clutch spring 82, a DC motor 84, a gear box electronic board 382, and deadbolt cover plate 86 (FIG. 1B). It should be understood that the lower surface of housing 72 has electrical contacts formed therein. The electrical contacts are in electrical connection with the electrical components housed in housing 72. Moreover, the lower surface of housing 72 is dimensioned to mate with slot S1 of housing 32. In this manner, the electrical contacts of housing 72 are put into electrical connection with electrical contacts 33 of slot S1. Bolt 74 includes a teeth portion 75. A gear of gear set 76 engages with teeth portion 75 to modify the position of bolt 74. In this regard, motor 84 drives gear set 76, which in turn modifies the position of bolt 74, to move bolt 74 between “unlocked” and “locked” positions. Gear set 76 are mounted to gear pins 78. Gear cam clutch 80 and gear clutch spring 82 are provided to prevent gear set 76 from binding or being damaged if bolt 74 becomes bound. It should be noted that gear cam clutch 80 has a cam portion which is used to trip limit switches located on electronic board 382. These limit switches are used to limit the travel of bolt 74. The operation of deadbolt assembly 70 will be described in greater detail below.

Battery unit 100 provides an electrical power source, and includes a battery housing 102, a circuit cover plate 104 and a unit cover plate 106. Battery housing 102 includes a battery compartment for receiving batteries (e.g., standard AA batteries). The batteries provide sufficient energy to power both primary lock assembly 30 and deadbolt assembly 70. As a result, primary lock assembly 30 and deadbolt assembly 70 can be powered without a hard wire connection. Electrical contacts 103 are formed in the upper surface of battery housing 102. These electrical contacts are in electrical connection with the batteries. It should be understood that the upper surface of battery housing 102 is dimensioned to be received into slot S2. In this manner, the batteries in battery unit 100 supply electrical power to the electrical components housed in housing 32.

Figure 2:
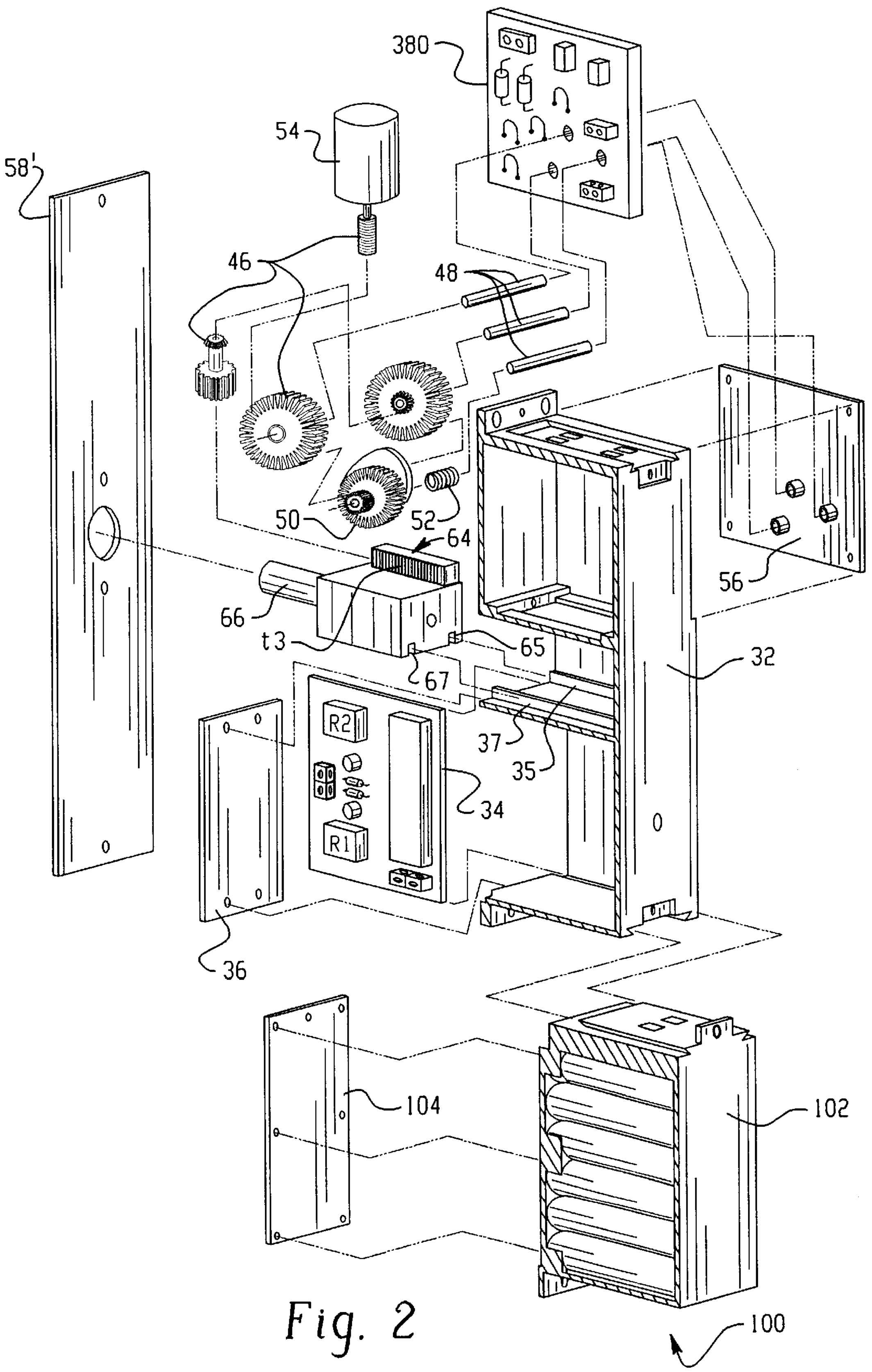
FIG. 2 is an exploded view of a door entry system according to an alternative embodiment of the present invention.
Figure 2A:
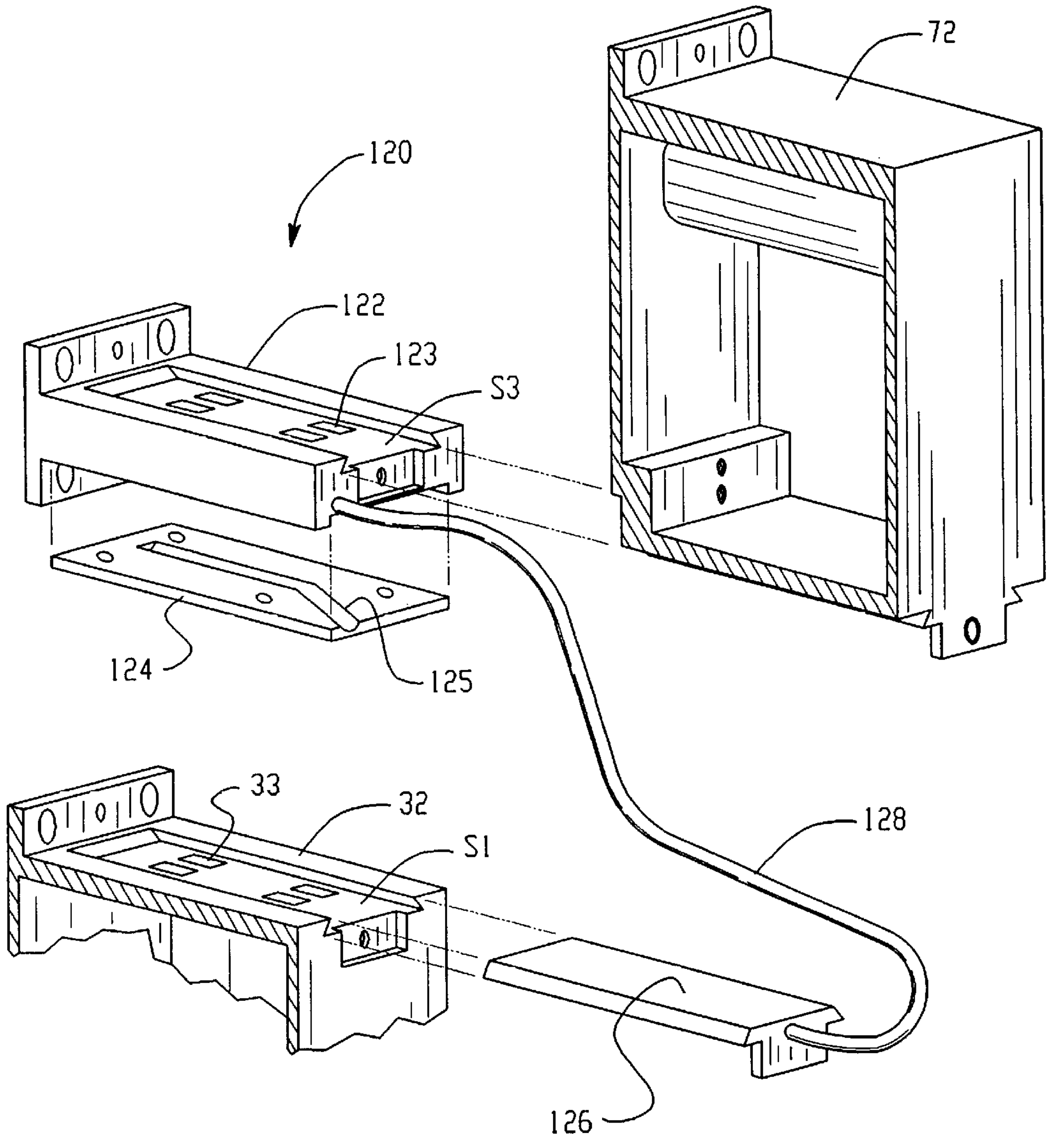
FIG. 2A is an exploded view of a deadbolt cable bracket assembly, according to a preferred embodiment of the present invention.

Referring now to FIG. 2A, cable bracket electrical interface assembly 120 provides a convenient means for communicating data between system components of primary assembly housing 32 and deadbolt assembly housing 72. Moreover, cable bracket electrical interface assembly 120 also provides a convenient means for electrical connection of system components to battery unit 100, or other power source. Cable bracket electrical interface assembly 120 is generally comprised of a "slide-on" offset interface bracket 122, a cable splice access plate 124, a "slide-on" primary interface bracket 126, and a cable 128.

Offset interface bracket 122 includes electrical contacts 123, which are in electrical contact (via cable 128) with electrical contacts (not shown) formed in primary bracket 126. Moreover, slot S3 is dimensioned to mate with lower surface of deadbolt assembly housing 72. Primary interface bracket 126 is dimensioned to mate with slot S1 of the upper surface of housing 32. In this manner electrical connection can be established and maintained between the electrical components of deadbolt assembly housing 72 and primary housing 32, and allow for housing 72 to be located a selectable offset distance from housing 32. Therefore, when cable bracket electrical interface assembly 120 is utilized, deadbolt assembly 70 can be located anywhere on the door, center frame post, or in the narrow doorjamb/frame section between the inner doorstop and the edge of the door casing. An appropriate length of cable 128 is conveniently provided between offset interface bracket 122 and primary interface bracket 126. In this regard, access plate 124 has a slot 125 formed therein which allows for convenient installation of a cable of appropriate length. The end of the cable inserted through slot 125 is connected with electrical contacts 123. Cable 128 is preferably a small diameter flexible cable having a plurality of conductors (preferably 4 conductors), and having a length which suitably varies in accordance with the particular application. Moreover, when offset interface bracket 122 is mated with deadbolt assembly housing 72, interface bracket 122 completes a deadbolt mounting flange, as best seen in FIG. 2A.

It should be understood that the electrical contacts in slot S2 are in electrical connection with electrical contacts 103 of battery housing 102 (FIGS. 1B and 2), or with the electrical contacts in slide-on primary interface bracket 126 (FIG. 2A).

In an alternative embodiment of the present invention, primary interface bracket 126 and cable 128 may be used separately to connect electrical components with an internal wiring system, which may be located within a wall. In this regard, primary interface bracket 126 is dimensioned to be received in slots S1 or S2 of housing 32 for directly connecting the electrical components of primary lock assembly 30 to electrical power, via an internal wiring system.

It should be further appreciated that in an alternative embodiment of the present invention, housing 72 may be directly connected with housing 32, thus eliminating the need for cable bracket electrical interface assembly 120. In this regard, the lower surface of housing 72 is directly mated with slot S1 of housing 32. Of course, in this case, bolt 74 of deadbolt assembly 70 must be located a fixed distance from sliding bolt assembly 40.

Figure 6:
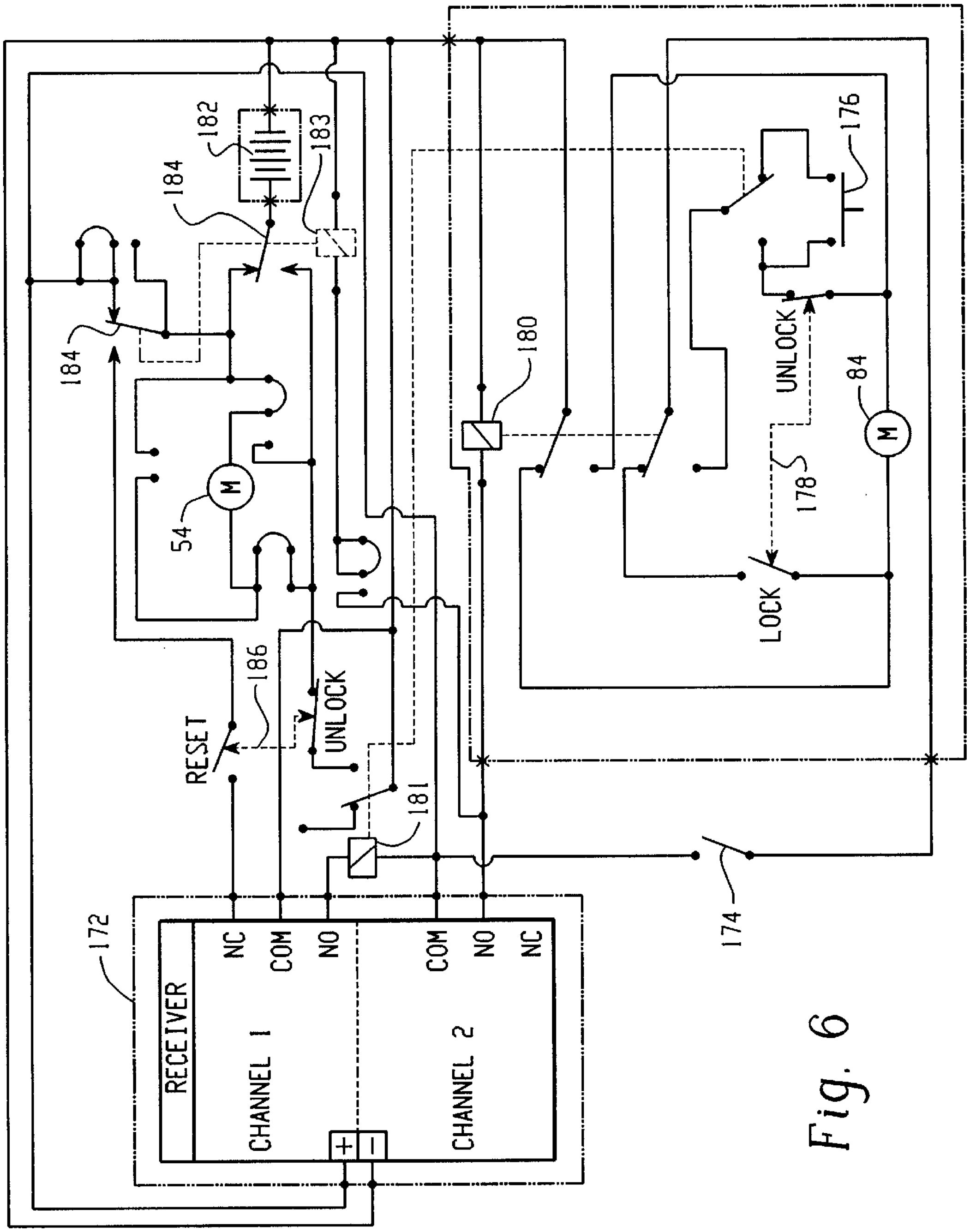
FIG. 6 is a schematic of the electronic controls of the present invention, in accordance with a preferred embodiment.

FIG. 6 shows a schematic of the control electronics of the present invention. The control electronics include a 2-channel (RF) receiver 172, a magnetic reed switch (N.O.) 174, a deadbolt bolt switch 176, deadbolt bolt cam limit switches 178 (N.O. and N.C., respectively), a deadbolt DPDT relay 180, a battery power supply 182 (housed in battery unit 100), two magnetic reed switches 184, primary bolt cam limit switches 186, a combination deadbolt and primary bolt DPDT relay 181 and an optional magnetic reed switch DPDT relay 183 bypass.

The control electronics also include a touch-pad transmitter T1 and a remote transmitter T2, shown in FIG. 1A. Touch-pad transmitter T1 preferably takes the form of a wall-mounted RF combination keypad transmitter, while remote transmitter T2 preferably takes the form of a portable key chain transmitting unit.

Figure 4A:
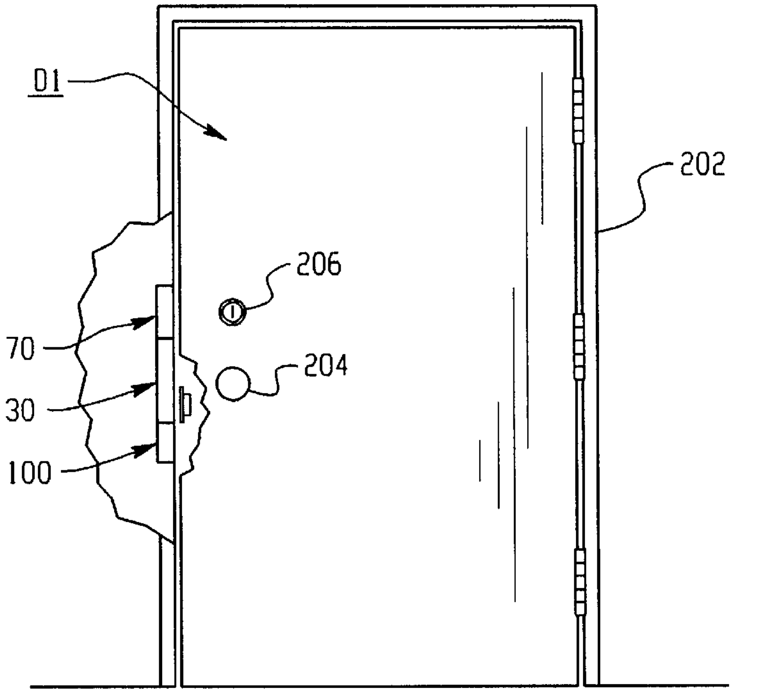
FIG. 4A is a partial cutaway view of a typical single door assembly.
Figure 4B:
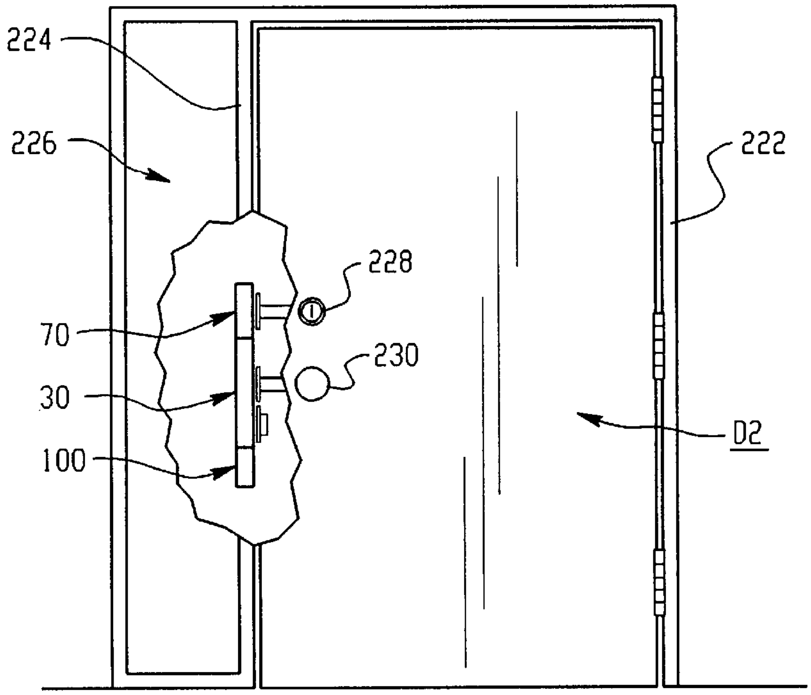
FIG. 4B is a partial cutaway view of a typical single door assembly with a side light glass unit.
Figure 4C:
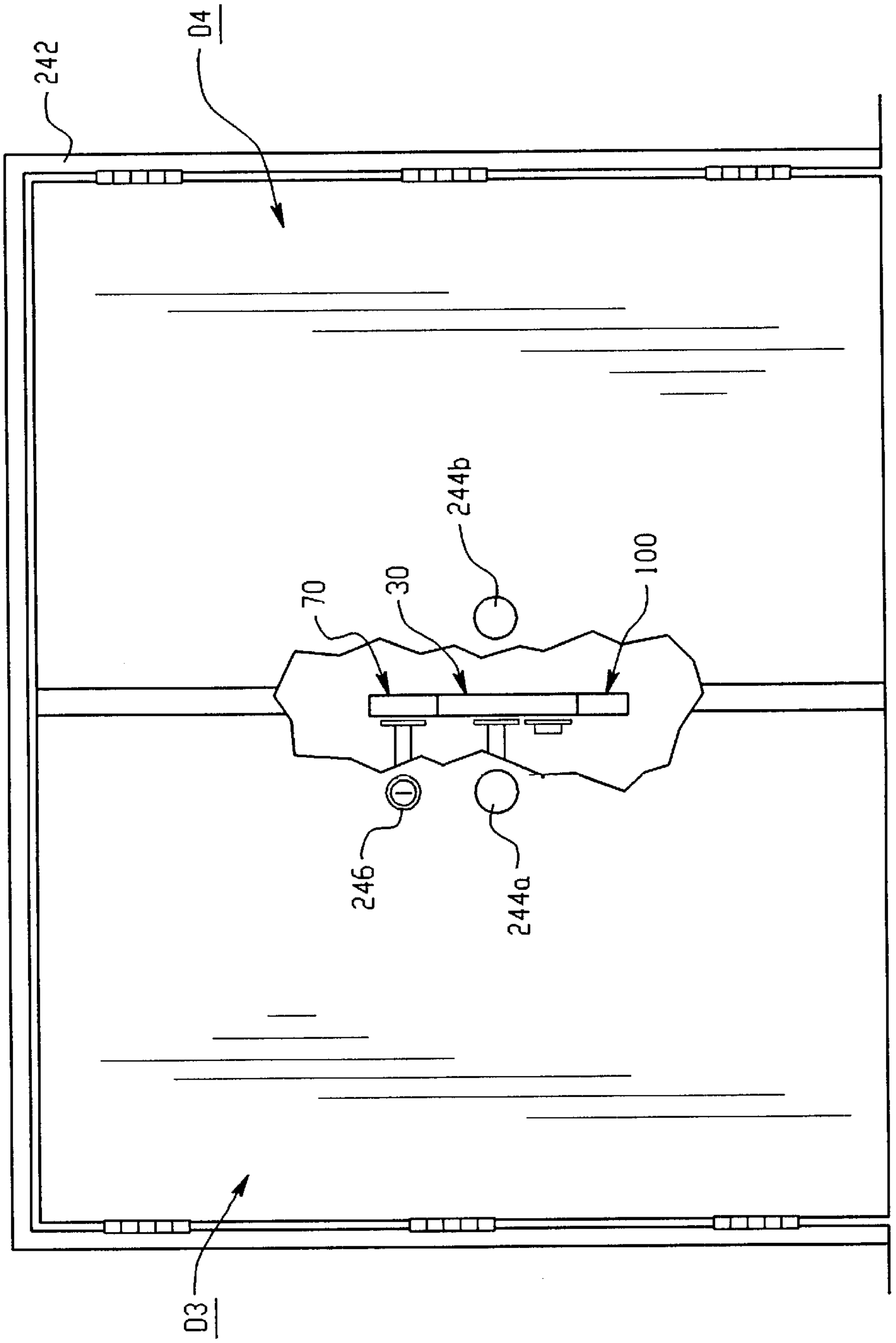
FIG. 4C is a partial cutaway view of a typical double door assembly.

It will be appreciated that door entry system 2 is suitable for use in connection with numerous types of door assemblies, including a single door assembly (FIG. 4A), a single door assembly with a side light glass unit (FIG. 4B), and a double door assembly (FIG. 4C). In this regard, components of door entry system 2 are suitable for installation in a door jamb/frame, as shown in FIG. 4A. In the embodiment shown in FIG. 4A, single door D1 is attached by a hinge to a doorjamb/frame. A door handle 204 and mechanical deadbolt 206 form a part of the door security. Primary lock assembly 30, deadbolt assembly 70 and battery unit 100 are shown concealed behind door casing 202. In the embodiment shown in FIG. 4B, single door D2 is attached by a hinge to a door jamb/frame. A door handle 230 and mechanical deadbolt 228 form a part of the door security. Primary lock assembly 30, deadbolt assembly 70 and battery unit 100 are shown concealed in center frame post 224 behind door casing 222 adjacent to side light glass unit 226. In the embodiment shown in FIG. 4C, active door D3 and stationary door D4 are attached by a hinge to a doorjamb/ frame. A door handle 244*a*, a door handle 244*b* and mechanical deadbolt 246 form a part of the door security. Primary lock assembly 30, deadbolt assembly 70 and battery unit 100 are shown concealed in the edge of stationary door D4. Door casing 242 is not used at this time to conceal assemblies 30, 70 or 100. It should be appreciated that the versatility of the present invention is due to the slim profile of the assemblies described above. Preferably, the assemblies do not exceed a width of 1¼ inch.

Figure 5A:
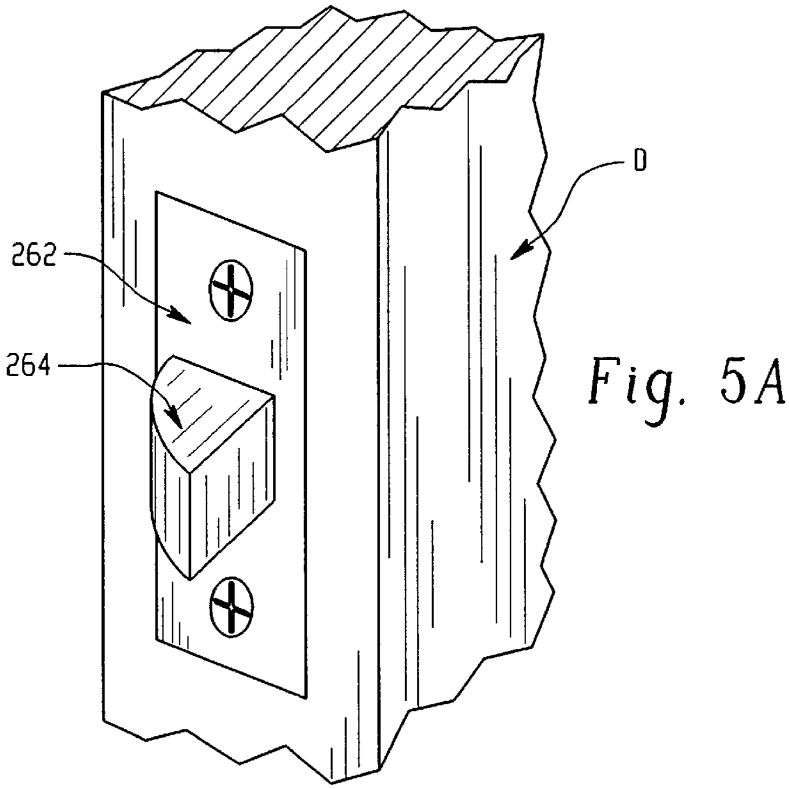
FIG. 5A is a perspective view of a standard spring latch bolt assembly.
Figure 5B:
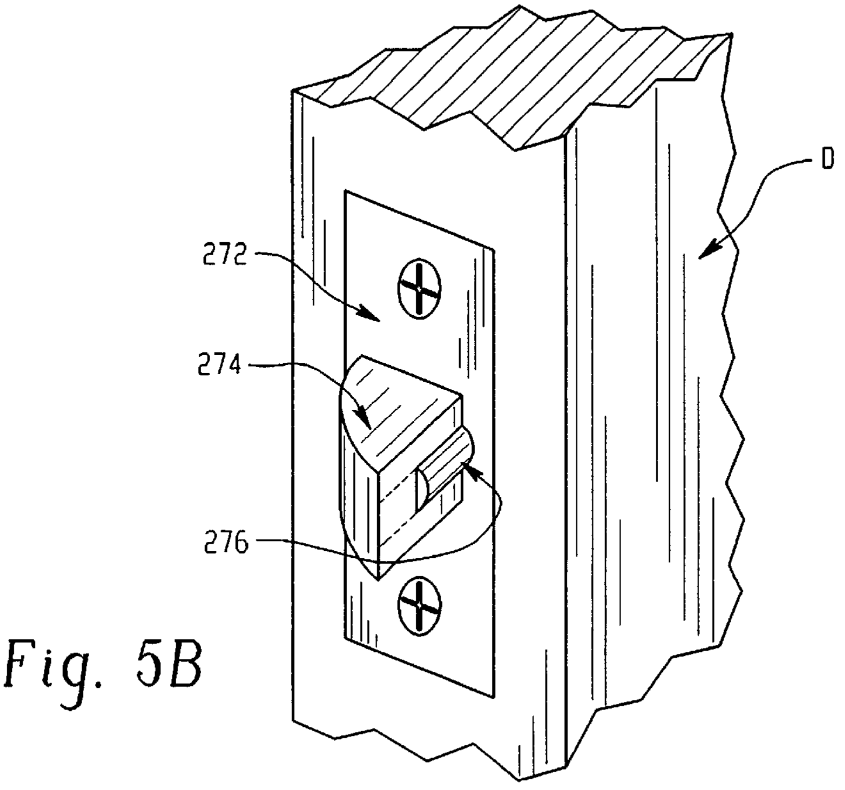
FIG. 5B is a perspective view of a standard spring and dead latch bolt assembly.

The operation of door entry system 2, will now be described in further detail. Primary lock assembly 30 can lock or unlock a door lock assembly having a standard spring latch (FIG. 5A) or a dead latch bolt (FIG. 5B). FIG. 5A illustrates a typical spring latch bolt assembly comprised of a spring latch bolt housing 262 mounted inside door D, and a spring latch bolt 264. FIG. 5B illustrates a typical standard spring and dead latch bolt assembly comprised of a spring and dead latch bolt housing 272 mounted inside door D, a spring latch bolt 274, and a dead latch bolt 276. Because of the versatility of the present invention, the existing door handle mechanism that already exists on the door does not have to be modified for use in connection with door entry system 2.

Figure 3A:
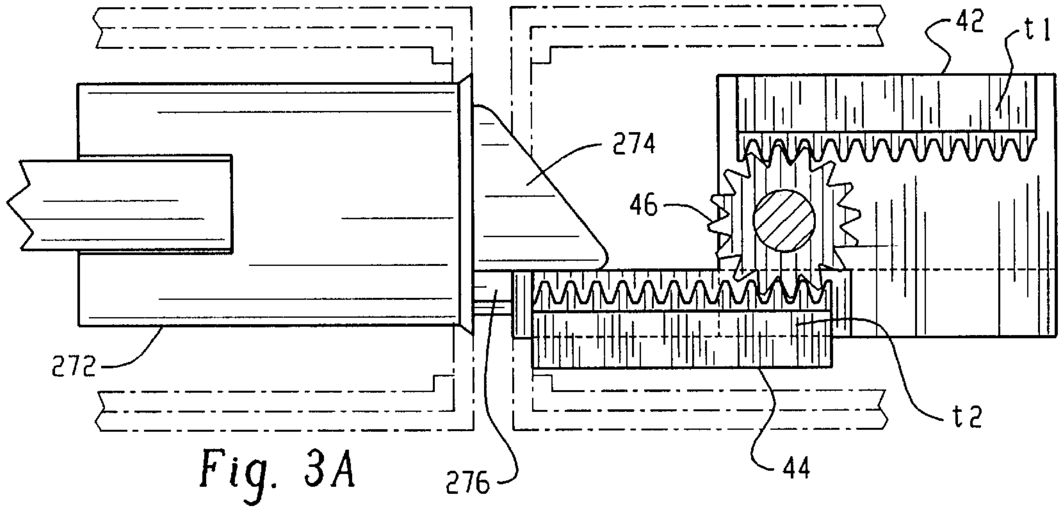
FIGS. 3A, 3B and 3C are top views of the door entry system of FIGS. 1A and 1B in a closed position, an intermediate position, and an open position.
Figure 3B:
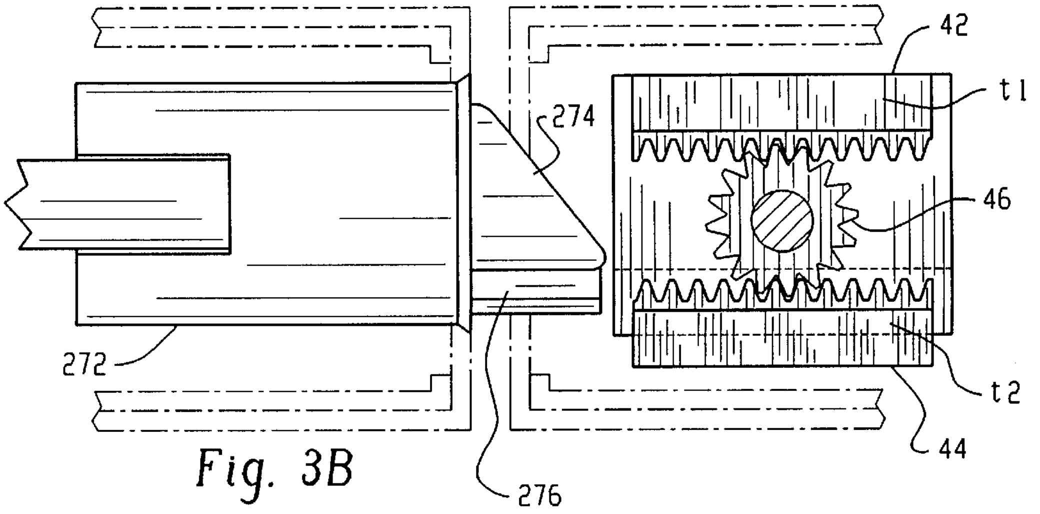
Figure 3C:
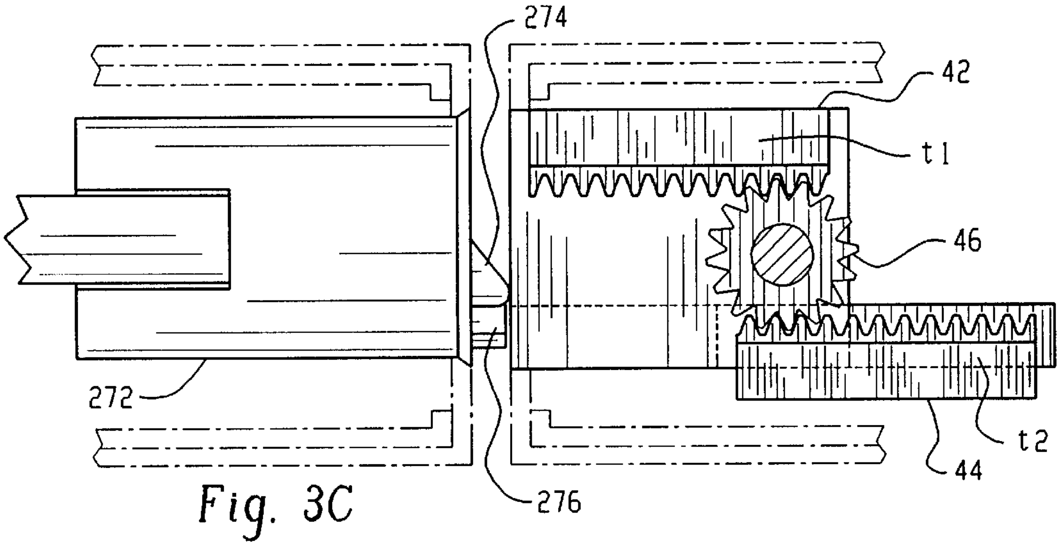
Figure 3D:
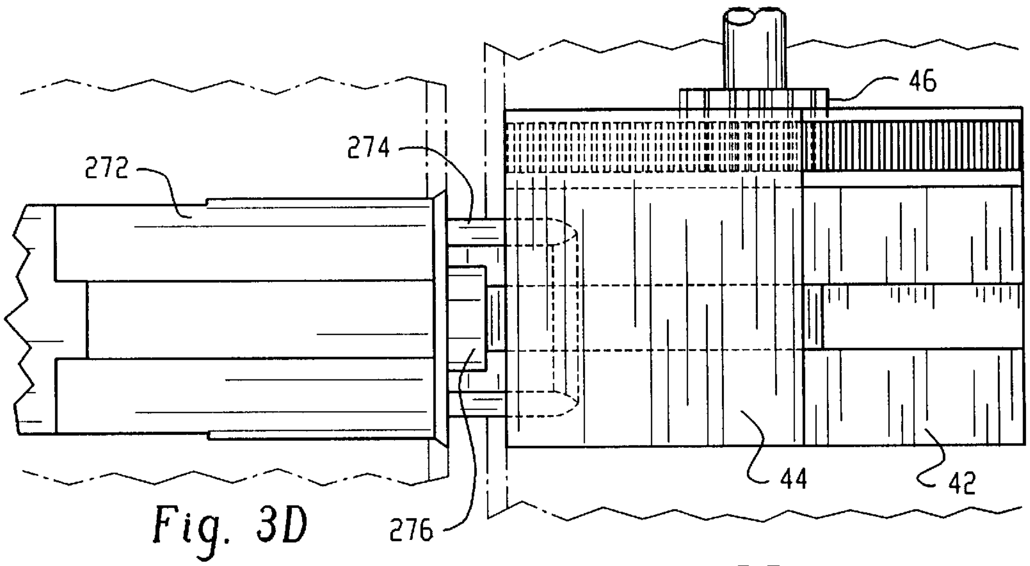
FIGS. 3D, 3E and 3F are side views of the door entry system of FIGS. 1A and 1B in a closed position, an intermediate position, and an open position.
Figure 3E:
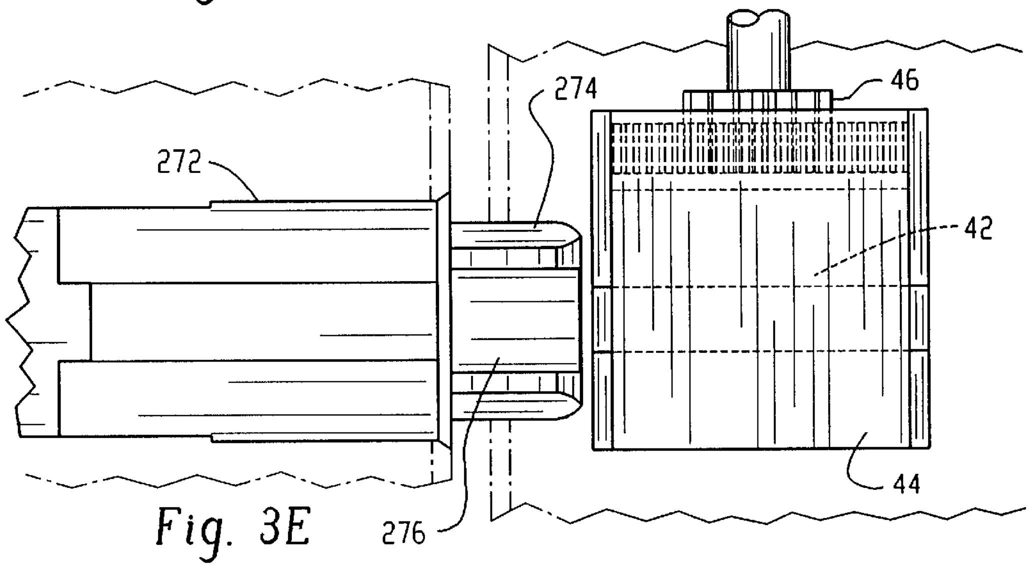
Figure 3F:
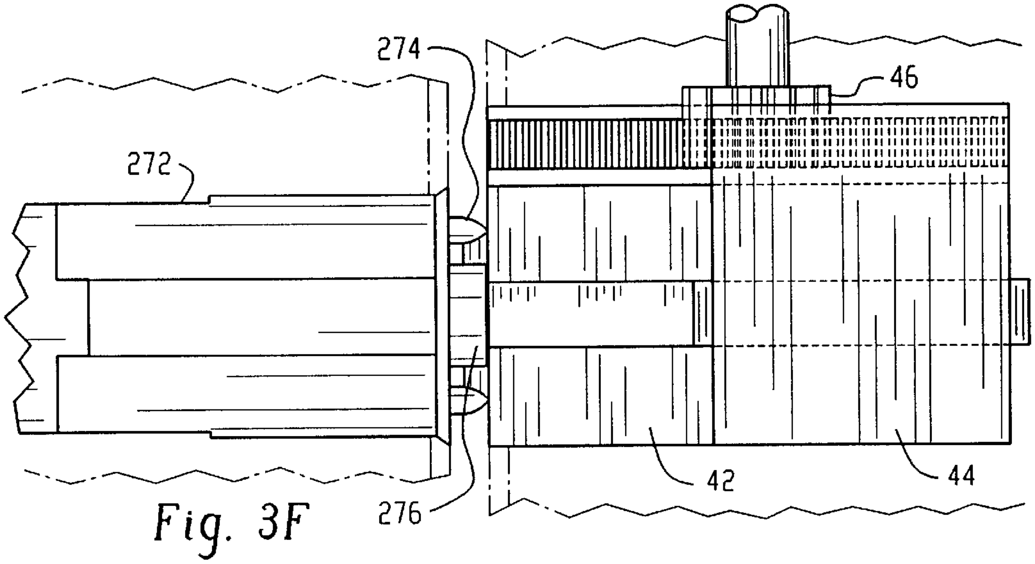

FIGS. 3A and 3D illustrate slide bolts 42, 44 in a "locked" position, FIGS. 3B and 3E illustrate slide bolts 42, 44 in an "intermediate" position, while FIGS. 3C and 3F illustrate slide bolts 42, 44 in an "unlocked" position. In the "locked" position slide bolt 44 engages and compresses dead latch bolt 276, while slide bolt 42 is disengaged from spring latch bolt 274. When activated to an "unlocked" position, gear 46 rotates and moves slide bolts 42, 44 in opposite directions. In this regard, slide bolt 42 moves toward housing 272 (i.e., extends), while slide bolt 44 moves away from housing 272 (i.e. retracts), to disengage and release dead latch bolt 276. The intermediate position is shown in FIGS. 3B and 3E. Dead latch bolt 276 is released by second slide bolt 44, just as the first slide bolt 42 begins to compress both latch bolts 274 and 276. When the "unlocked" position is reached, slide bolt 42 engages and compresses both spring latch bolt 274 and dead latch bolt 276 (FIGS. 3C and 3F). As a result, the door can be opened by merely pushing on the door. It will be appreciated that when slide bolts 42, 44 are in the "locked" position, and no deadbolt assembly 70 is in operation, the door is not actually locked, but rather it requires a door handle to be rotated in order to open the door.

In many cases, primary lock assembly 30 is used in conjunction with deadbolt assembly 70. When deadbolt assembly 70 is activated to a "locked" position, bolt 74 moves to an extended position, and protrudes into a door, door jamb/frame, center frame post, or the like, to prevent the associated door from being opened. When deadbolt assembly is activated to an "unlocked" position, bolt 74 moves to a retracted position inside deadbolt housing 72. As the bolt 74 moves to the retracted position, the first and second slide bolts 42, 44 of sliding bolt assembly 40 will simultaneously move to an "unlocked position" (FIGS. 3C and 3F).

It should be understood that when an operator opens the unlocked door, several magnetic reed switches 174 and 184 located in housing 32 of primary lock assembly 30 will automatically reset the sliding bolt assembly 40, but not the motorized bolt 74, which is in the "unlocked" position. Bolt 74 will stay in the "unlocked" position until the operator decides to activate deadbolt assembly 70. When activated, bolt 74 extends to a "locked" position, wherein bolt 74 locks the associated door.

When an operator wants to remotely unlock a standard dead latch (FIG. 5B) or spring latch (FIG. 5A) door handle, all that is required is a single press of the open/unlock button on remote transmitter T2, or alternatively the operator can enter an access code on touch pad transmitter T1. Receiver 172 opens and closes a set of contacts that permit DC motor 54 to be powered, which in turn rotates gear set 46. This rotation of the gears causes first and second slide bolts 42, 44 to move to the "unlocked" position from the "locked" position (FIGS. 3A–3F). Latch bolts 274 and 276 are both compressed, thus allowing an operator to simply push the door open. When the door is opened, magnetic reed switches 174 and 184, located in housing 32 of primary lock assembly 30, will automatically reset the first and second slide bolts 42, 44. Therefore, as soon as the operator closes the door, primary lock assembly 30 is already reset. The operator, without taking any further action, will not have to lock the door handle 204, 230 or 244*a*.

It should be appreciated that primary lock assembly 30 does not affect the operation of any passive or active standard dead latch (FIG. 5B) or spring latch (FIG. 5A) door handle arrangement. The operator can still manually open the above arrangements with his/her original door key, thus not interfering with the operation of the existing door lock hardware.

When the operator wants to remotely "lock" a door with deadbolt assembly 70, all that is required is a single press of a close/lock button on key chain transmitter T2, or the operator can punch in the access code on wall mounted RF combination keypad transmitter T1. Receiver 172 opens and closes a set of contacts that permits the DC motor 84 to be powered, which in turn rotates deadbolt gear set 76. Rotation of the gears causes bolt 74 to move to an extended position toward the front of the housing, until the bolt 74 is fully extended, thus not allowing the door to be opened.

When the operator wants to "unlock" a door the operator has two options. The first option is to use transmitters T1 or T2, and the second option is the use of the original door key. When the operator presses the open/unlock button on key chain transmitter T2 or the operator enters an access code on the wall mounted RF combination keypad transmitter T1, receiver 172 opens and closes a set of contacts that permits both DC motors 54 and 84 to be powered, which in turn rotates both gear sets 46 and 76. The rotating gears cause bolt 74 and first and second slide bolts 42, 44 to move. Bolt 74 will fully retract into housing 72 while at the same time slide bolts 42, 44 move to a position releasing the door's dead latch bolt or spring latch bolt lock handle mechanism. This allows the operator to simply push the door open.

Figure 7A:
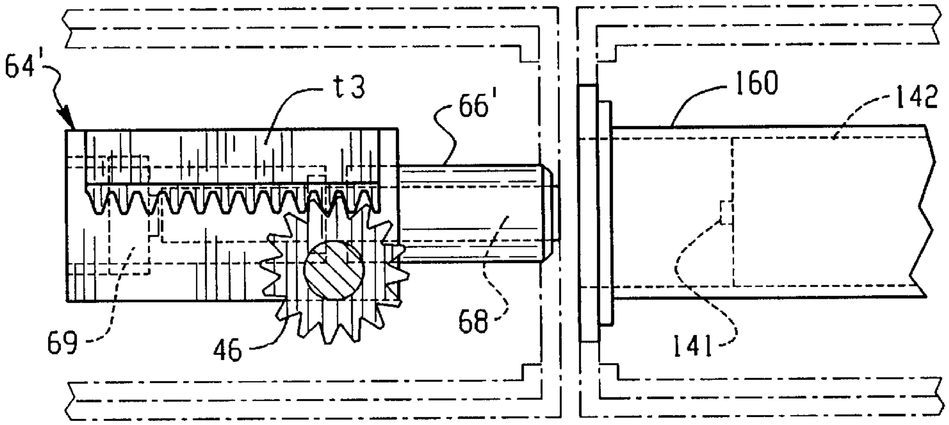
FIGS. 7A, 7B and 7C are top views of the door entry system of FIGS. 1B and/or FIG. 2, in a closed position, an intermediate position, and an open position, according to an alternative embodiment of the present invention.
Figure 7B:
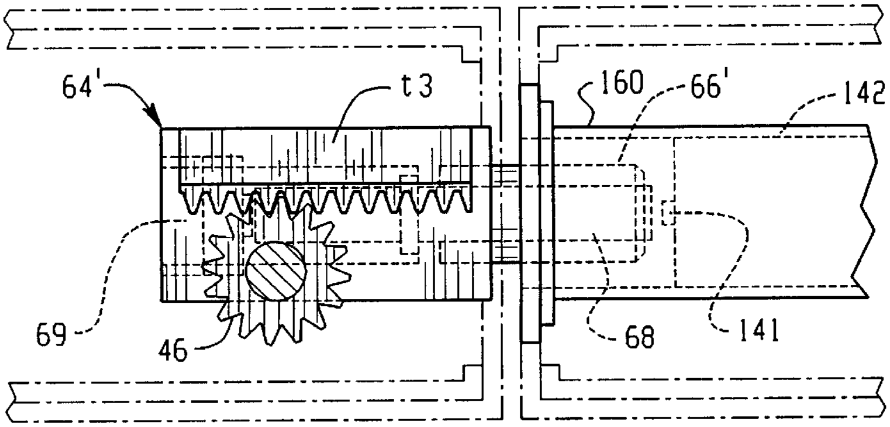
Figure 7C:
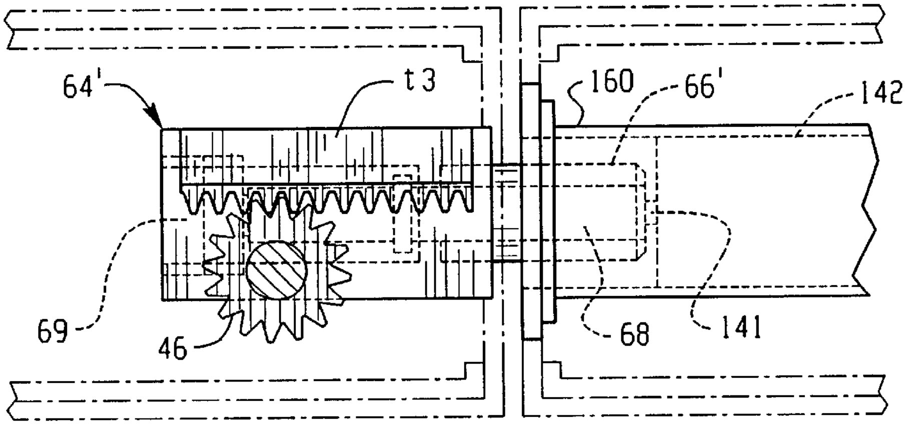

Referring now to FIGS. 7A–7C, an alternative embodiment of a deadbolt block will be described. Deadbolt block 64' is similar in many respects to deadbolt block 64 and deadbolt bolt 74, described above. However, deadbolt block 64' has a modified bolt portion 66'. In this regard, bolt portion 66' is bored and counter bored to provide a recess for receiving a spring loaded button switch 69 (which preferably takes the form of a miniature or sub-miniature snap-switch). A hardened steel plunger rod 68 preferably protrudes $1/16^{th}$ of an inch outside the front face of bolt portion 66' when disengaged. Button switch 69 also includes an electrical connection interface, which is connected with a latching circuit. Deadbolt block 64' can be used as a substitute for slide blocks 42, 44, deadbolt bolt 74, or deadbolt block 64. Moreover, suitable housings and electrical components may be provided to allow deadbolt block 64' to be used together with slide blocks 42, 44, as will be described in further detail below.

Deadbolt block 64' operates in the following manner. If an original door key is used to open/unlock the door, all the operator needs to do is to insert his/her key in the door's original mechanical deadbolt's cylinder and turn the key until the door's mechanical deadbolt bolt pushes plunger rod 68, which compresses button switch 69. When the door's deadbolt bolt compresses button switch 69, a latching circuit is activated. Activation of the latching circuit causes bolt 64' to retract back into its housing, while at the same time cycling the first and second slide bolts 42, 44 within a few moments (e.g., one second), thus allowing the door to be opened. When the operator opens the door, several magnetic reed switches located in housing 32 will automatically reset first and second slide bolts 42, 44, while leaving deadbolt block 64' in the unlocked/retracted position. Therefore, as soon as the operator closes the door, primary lock assembly 30 is already set so that the operator is able to remotely lock deadbolt block 64' if desired or remotely unlock the door's spring latch or dead latch bolt door handle mechanism.

Figure 8:
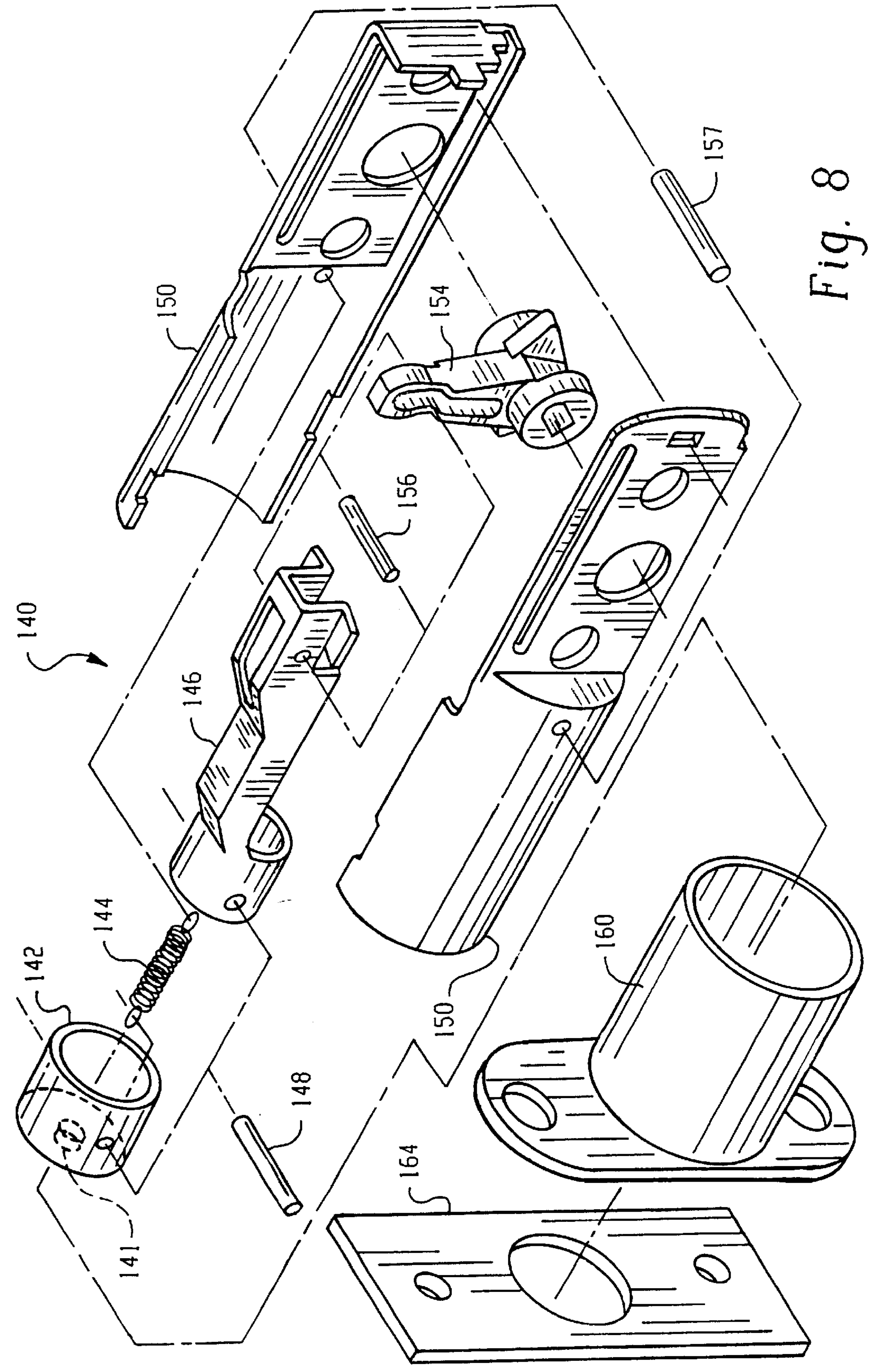
FIG. 8 is an exploded view of a deadbolt latch body housing assembly, according to a preferred embodiment of the present invention.

A manual key unlocking sequence is initiated when the existing door's deadbolt's key is inserted into the deadbolt's key cylinder and the deadbolt bolt is manually moved out into the traditional extended position. The reason moving the door's deadbolt bolt into the extended position does not lock the door, is due to the fact that the door's standard deadbolt bolt latch body housing assembly is replaced with a deadbolt lever body housing assembly 140, while still using the deadbolt's existing key cylinder. An exploded view of deadbolt lever body housing assembly 140 is illustrated in FIG. 8. Assembly 140 is generally comprised of a forward bolt section 142, a rearward bolt push rod section 146, a rearward casing 150, and a push lever operating means 154. A lever pin 156 is slid between lever operating means 154 and pressed into bolt push rod section 146. Forward bolt section 142 includes a protuberance 141 on its front face, and is fixed to rearward bolt push rod section 146. A return spring 144 is attached to forward bolt section 142 by bolt guide pin 148. Spring 144 is also attached to pin 157, such that spring 144 biases (i.e. pulls) forward bolt section 142 toward pin 157 (i.e., the retracted position). A face plate 164 is attached to a forward casing 160. Forward casing 160 has an opening dimensioned to receive rearward casing 150. When a rotational force is applied to lever operating means 154, forward bolt section 142 moves to an extended position, wherein the front face of forward bolt section 142 becomes generally flush with face plate 164. When assembly 140 is in the retracted position, it is not flush to the faceplate, like the traditional deadbolt latch body housing, but instead is automatically retracted by spring 144 approximately 1 inch within casing 160 and 150. This retracted position allows deadbolt block 64', when remotely activated, to insert into the door mounted modified deadbolt's housing, a depth of approximately ¾ of an inch thus, preventing the door from being opened. Deadbolt block 64' can be retracted with a key, with key chain transmitter T2, or with a surface mounted touch combination pad transmitter T1.

To open the deadbolted door (FIG. 7B) using a key, the operator merely inserts the key into the door's deadbolt, and turn the key so that protuberance 141 of forward bolt section 142 contacts the face of extended deadbolt block 64' (FIG. 7C). As indicated above, deadbolt block 64', which is already inserted in deadbolt lever body housing assembly 140, has a hardened steel plunger rod 68 protruding (approximately 1/16 of an inch) from the face/end of deadbolt block 64'. When compressed, the spring plunger button switch 69 activates a latching retract circuit. The activated latching circuit automatically retracts deadbolt block 64' and the first and second slide bolts 42, 44 within moments (e.g., approximately one second), thus allowing the door to be opened. It should be noted that the spring plunger button switch is centered and recessed on the rear of deadbolt block 64', and is also centered to the face of the door's deadbolt's bolt face 142 and protuberance 141. When in the locked position, forward bolt section 142 and deadbolt block 64' have approximately ¼ of an inch air gap between each other (FIG. 7B). Deadbolt block 64' can also be remotely operated, powered, and has the same tamper resistant qualities as mentioned above in connection with primary lock assembly 30 and deadbolt assembly 70.

Referring now to FIGS. 9 and 10A–10C an alternative embodiment for the sliding bolt assembly will be described. Sliding bolt assembly 340 is similar in many respects to sliding bolt assembly 40. However, sliding bolt assembly 340 uses a cam member 350 to modify the position of first and second slide bolts 342 and 344. In this regard, first and second slide bolts 342 and 344 respectively include a generally sloped cam portion c1 and a generally sloped cam portion c2 for engaging with cam member 350. The cam portions c1 and c2 replace the teeth portions t1 and t2 described above in connection with slide bolts 42 and 44. Use of a cam allows for a reduction in space needed for operation of slide bolts. In this regard, the slide bolts do not need to be offset from each other in the manner described above in connection with slide bolts 42 and 44.

Cam member 350 includes a pair of cam arms 352*a* and 352*b*, which are transverse to each other (e.g., generally perpendicular). Moreover, cam arms 352*a* and 352*b* are not coplanar, but rather are offset from each other. Each cam arm 352*a*, 352*b* includes a rotatable disk 354 at the two distal ends thereof. The rotatable disks 354 engage with cam portions c1 and c2, as will be described below with reference to FIGS. 10A–10C. Cam arm 352*a* is engageable with cam portion c1, while cam arm 352*b* is engageable with cam portion c2. Each slide bolt 342, 344 may be biased away from strike plate 58. For instance, a spring (not shown) may be attached between each slide bolt 342, 344 and housing 32. The spring may be attached to slide bolts 342, 344 by boring a hole in the respective slide bolts 342, 344 and hooking the spring to a pin located therein.

Figure 9:
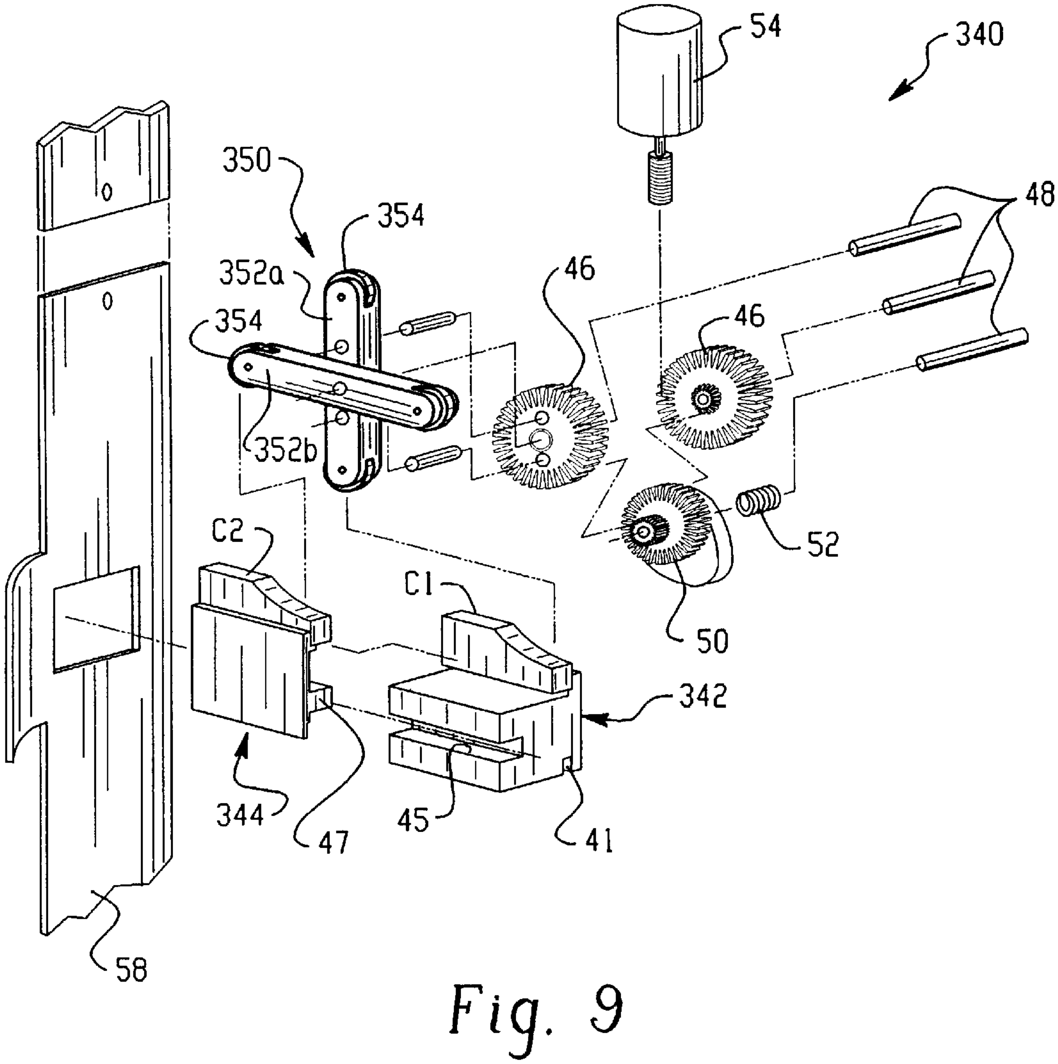
FIG. 9 is an exploded view of an alternative embodiment of a sliding bolt assembly.

It should be appreciated that the cam arrangement illustrated in FIG. 9 is shown solely for the purpose of illustrating a preferred embodiment of the present invention, and that other cam arrangements are also suitable. For instance, the cam member could be configured with cam arms that have only one distal end. The use of two distal ends for each cam arm allows for faster setting/resetting of the sliding bolt assembly. Moreover, each cam arm could be configured with more than two distal ends to allow for even faster settting/resetting of the sliding bolt assembly.

Figure 10A:
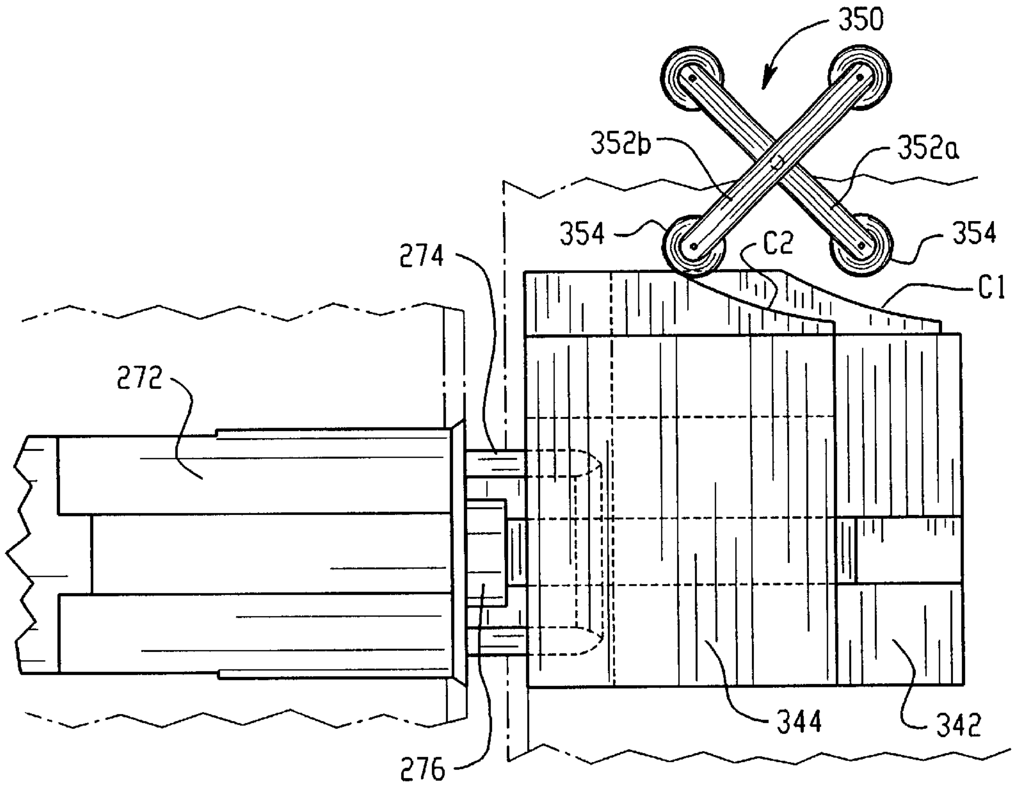
FIGS. 10A, 10B and 10C are side views of a sliding bolt assembly of FIG. 9 in a closed position, an intermediate position, and an open position.
Figure 10B:
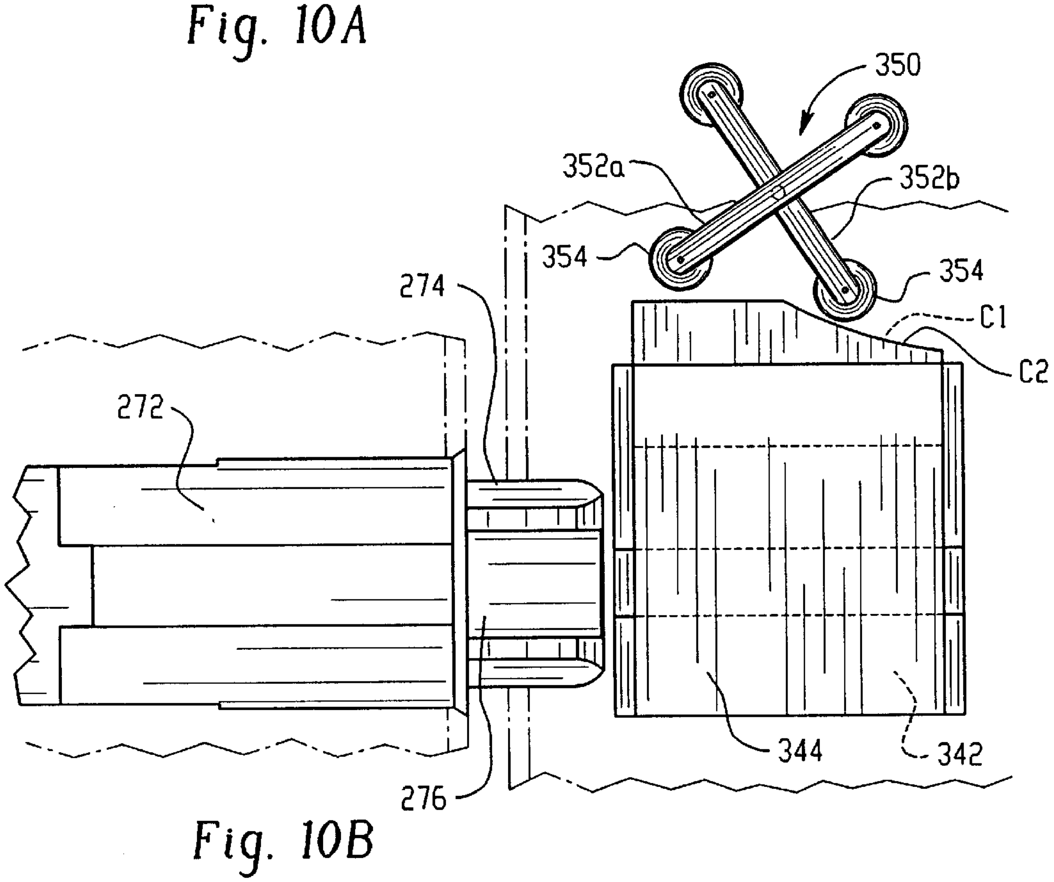
Figure 10C:
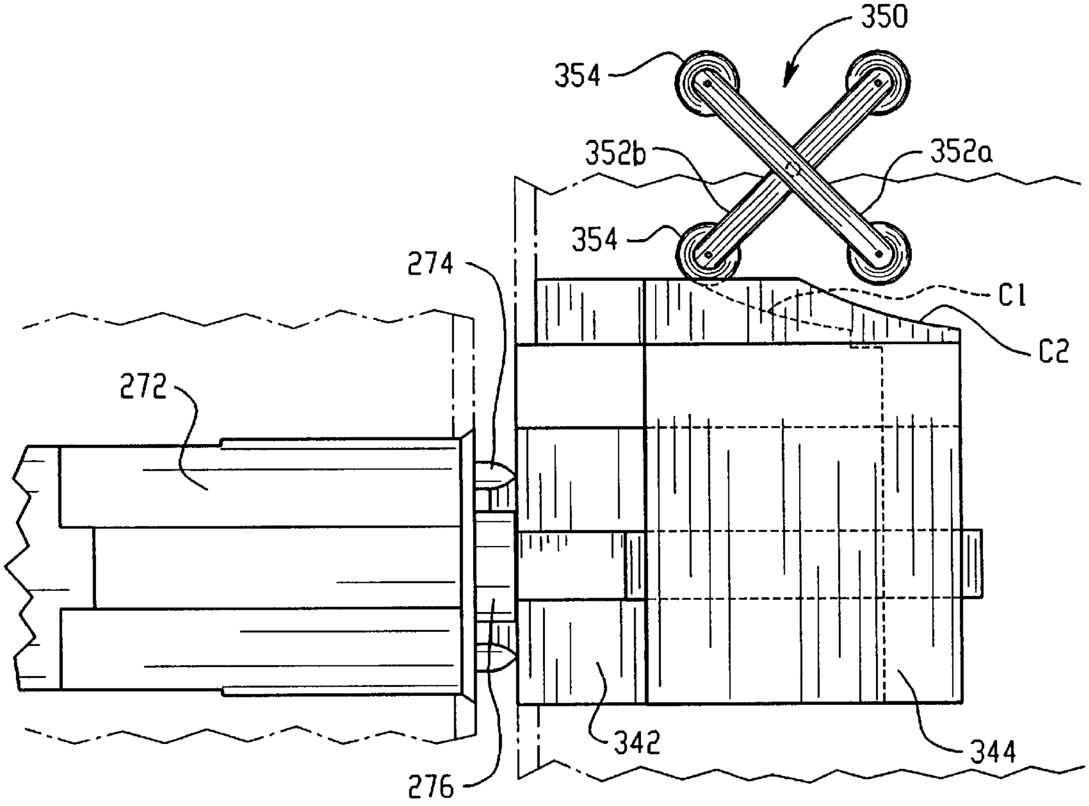

FIG. 10A illustrates slide bolts 342, 344 in a "locked" position, FIG. 10B illustrates slide bolts 342, 344 in an "intermediate" position, while FIG. 10C illustrates slide bolt 342, 344 in an "unlocked" position. In the "locked" position slide bolt 344 engages and compresses dead latch bolt 276, while slide bolt 342 is disengaged from spring latch bolt 274. Slide bolt 344 is moved to engage dead latch bolt 276 by cam arm 352*b* engaging with cam portion c2. When activated to an "unlocked" position, cam member 350 rotates such that cam arm 352*b* releases cam portion c2. Accordingly, slide bolt 344 retracts (i.e., moves away from housing 272) due to the force applied by deadbolt latch 276 and/or the force applied by a bias member attached to slide bolt 344, such as the spring described above. The intermediate position is shown in FIG. 10B, wherein both slide bolt 342 and 344 are retracted. In this position neither cam portion c1 or c2 is engaged with a cam arm. When the "unlocked" position is reached, slide bolt 342 engages and compresses both spring latch bolt 274 and dead latch bolt 276 (FIG. 10C). In this regard, cam member 350 continues to rotate such that cam arm 352*b* engages with cam portion c1. It should be understood that as cam member 350 is further rotated in the clockwise direction, slide block 342 will be released, thus returning to an intermediate position. Next, cam portion c2 of slide block 344 will be engaged by cam arm 352*a*, as the next "locking" cycle commences.

As indicated above, the present invention has numerous advantages over the prior art. In this respect, the components of the present invention which are mounted in a door, door jamb/frame, center frame post, or the like, have a very slim profile (e.g., 1¼ inches wide and 2 inches deep). The slim line width design, enables the present invention to fit in areas, such as the inside of a standard steel or wood double hung door (FIG. 4C), in the center frame post of a door assembly that has a side light glass unit (FIG. 4B), or in the narrow door jamb/frame section between the inner door stop and the edge of the door casing (FIG. 4A). The slim line depth design allows the invention to be hidden behind any 2¼ inch or larger door casing trim, thus eliminating any interior trim or wall damage. The width of a standard door can vary from 1¾ inches to 2¼ inches. This variation in door widths effects the location of the door's strike plate and faceplate. However, this offset will not affect the installation or operation of the present invention. This is due to the dimensions of the present invention. These dimensions allows the present invention to be offset to the required centering point that corresponds to the existing door width.

Another advantage of the present invention is enhanced security. Since the present invention can be concealed in the core of a door, center post, or jamb/frame, it is very secure and tamper resistant. When the present invention is installed, only the strike plate 58 or inner faceplates 106, 88 or 58' are visible when the door is open. In addition, one of the reed switches of the present invention can be wired into an alarm system. When the alarm system is activated/armed and the door is opened, the magnetic reed switch designated as the door alarm switch, will trigger/set off the alarm.

The present invention can be hardwired or battery operated with the easy slide-on battery unit 100. This battery attachment is designed to slide on to the bottom of housing 32 with no internal or external wiring needed. The batteries are easily accessed from the front of battery housing 102 by two separate removable cover plates 104 and 106 located below strike plate 58.

The first and second slide bolts 42, 44 are unique in the way they are used to unlock any standard spring latch bolt or a dead latch bolt door handle set. As described above, to unlock a standard spring latch or dead latch bolt door handle mechanism, second slide bolt 44 is moved towards the rear of housing 32, thus releasing the door's dead latch bolt 276. As second slide bolt 44 moves back into housing 32, first slide bolt 42 simultaneously moves from the rear of housing 32 to the front of housing 32. This movement compresses the spring latch bolt 274 and/or dead latch bolt 276, at the same time, back into the doors lock set, thus unlocking the locked door (FIGS. 3A–3F).

It should be appreciated that one important concept embodied by sliding bolt assembly 40 is the timing of gear set 46, first slide bolt 42 and second slide bolt 44. In particular it is noted that first slide bolt 42 and second slide bolt 44 are offset (e.g., by one inch), thus allowing second slide bolt 44 to release only the door's dead latch bolt 276 just before first slide bolt 42 starts to compress both the door's spring latch bolt 274 and the dead latch bolt door handle mechanism. When the door's spring latch bolt 274 and the dead latch bolt 276 are fully compressed into the door's lockset, the door can be opened. This complete operation is accomplished with a few moments (e.g., one second) while delivering a rated load greater than 100 oz./inches.

Another unique feature of sliding bolt assembly 40 is its reversibility. The same first and second slide bolts 42, 44 can operate a right hand door handle set or a left hand door handle set, without having to flip housing 32 upside down. First and second slide bolts 42, 44 are quickly and easily removed from the front of housing 32 and installed in the flipped reverse order. This is possible because both of the slid bolts 42, 44 are designed to be symmetrical on each of their ends and their teeth portions are equally centered in relationship to gear set 46. Since slide bolts 42, 44 can be installed in the flipped reverse order and housing 32 is not rotated, it enables the present invention to be aligned with existing door hardware and can accomplish multiple functions, as elaborated above.

Another significant feature of the present invention is the slim inline, slide-on deadbolt assembly 70. Deadbolt assembly 70 is operated off of the power and control signals of primary lock assembly 30. In this regard, deadbolt assembly 70 uses the same permanently wired building electrical power supply or the battery power supply of battery unit 100. Moreover, housing 72 is conveniently slid on to the top of housing 32. Deadbolt assembly 70 is installed as a one-piece unit in the core of a door, door jamb/frame, center frame post, or the like. Deadbolt assembly 70 is tamper resistant due to the complete assembly being concealed as described above.

The present invention also provides a very convenient system to operate. As discussed above, deadbolt assembly 70 is moved to a "locked" position by the touch of the lock button on the operator's RF key chain transmitter T2 or by entering the access code on the wall mounted RF combination keypad transmitter T1. When bolt 74 is extended out, in the locked position and the operator wants to unlock the door from the interior or exterior of the building, all the operator needs to do is to push the unlock button on RF key chain transmitter T2 or punch in the access code on the wall mounted RF combination keypad transmitter T1. Accordingly, in one procedure, two devices can be unlocked at the same time. Both the primary door handle set and the motorized deadbolt 74 will retract within moments (e.g., one second) thus, allowing the operator to open the previously locked door.

Another unique aspect of the present invention is the manual key, automatic unlock feature. By utilizing a modified deadbolt bolt lever body housing, the ability to manually unlock a deadbolt is maintained and enhanced, as discussed above.

The preferred length of housing 32 to the center location of first and second slide bolts 42, 44 is important to the present invention's compatibility with existing one piece deadbolt and handle sets that have 5½ inch offsets. When housing 32 is installed in a door, center frame post, or in the narrow door jamb/frame section, between the inner door stop and the edge of the door casing, it is dimensioned such that housing 32 will not interfere with any existing door mounted keyed deadbolt faceplates. When housing 72 is installed on the top of housing 32, the center line of bolt 74 to the center line of slide bolts 42, 44 is approximately 5½ inches. This 5½ inch offset allows deadbolt assembly 70 to operate with, or without, any existing door mounted deadbolt assemblies or with any one-piece deadbolt and handle sets.

Slip gear cam clutches 50 and 80 are respectively a part of gear sets 46 and 76. Each slip gear cam clutch 50, 80 is used to prevent the respective gear set 46, 76 from binding or being damaged if first and second slide bolt 42, 44, bolt 74 or the gear sets 46, 76 are bound, and the clutch exceeds its maximum torque rating. This binding condition can occur if the door is not closed completely and the operator sends the signal to move the bolt 74 to a locked position. In this situation, bolt 74 can wedge into the door, when mounted in the door jamb/frame, or bolt 74 can wedge into the trim/casing when the assembly is mounted/installed in the door. The cam end of each slip gear cam clutch 50, 80 are located on the output side of each assembly and are used to operate several switches/contacts that are mounted on electronic boards 380, 382 and are used to limit the travel of first and second slide bolts 42, 44, bolt 74 and deadbolt block 64. Each cam needs to be located on the output side of each assembly, because of the cam position, in relationship to first and second slide bolts 42, 44, deadbolt block 64 and bolt 74. If the input side/motor side of slip gear cam clutch 50, 80 slips and rotates to a random position, the slipping motion will not effect the output side of the slip gear cam clutch's cam position in relationship to first and second slide bolts 42,44 and deadbolt bolts 74. This is due to the fact that the output side of slip gear cam clutch 50, 80 will not rotate when the input side of slip gear cam clutch 50, 80 exceeds its maximum rated torque and slips/rotates.

If only a remotely activated motorized dead bolt is required, the sliding bolt assembly 40 can easily be removed from the front of housing 32 and a one-piece deadbolt block 64 or 64' can be installed (FIG. 2). This one-piece deadbolt block 64 or 64' will protrude (e.g., ¾ of an inch) past the face of housing 32 when in the locked/extended position. This simple single block design allows the same housing 32, electronic control circuit, and gear set arrangement to remain unchanged. However, the operation of the primary lock assembly 30 will change from a device that unlocks a standard spring latch and/or dead latch door handle bolt mechanism to a compact stand alone remotely-operated motorized deadbolt, that also has the same tamper resistance described above.

It should be appreciated that the present invention utilizes several miniature magnetic reed switches to enable operation during certain situations. For example, when the door is open the magnetic reed switches will change states due to the fact that a magnetic pick up mounted in the edge of the door or door jamb/frame, which is determined by the location of the invention, is not in alignment with the miniature reed switches located in the front of housing 32, right behind strike plate 58 or 58'. This change in the miniature reed switches state, which is the door open state, will automatically reset sliding bolt assembly 40 or deadbolt block 64, and will also disable the circuit for motorized deadbolt assembly 70. This prevents the operator from mistakenly extending bolt 74 when the door is open. When the door is closed, the miniature reed switches state is changed, due to the fact that the magnetic pickup is located in front and parallel with the reed switches. The new state of the reed switches, enables bolt 74 to be extended into the locked position, if desired, and allows both the bolt 74 and sliding bolt assembly 40 or deadbolt block 64 to simultaneously unlock the door when the operator gives that command as mentioned above. The reed switches also enable the present invention to operate longer on its battery power due to the fact that the reed switches are not operated off of a coil, like a standard relay, but rather a permanent magnet. Another advantage of using reed switches is the fact that one of the reed switches can be tied into an alarm system. When the alarm system is activated/armed and the door is opened, the reed switch designated as the door alarm switch, will trigger/set off the alarm in the building.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A door entry system comprising:

a first slide member which is selectively movable between an extended position and a retracted position such that, in its extended position, an end of the first slide member is positioned in an opening, and in its retracted position, the end of the first slide member is removed from the opening;

a second slide member which is selectively movable between an extended position and a retracted position such that, in its extended position, an end of the second slide member is positioned in the opening, and in its retracted position, the end of the second slide member is removed from the opening; and, a drive which moves the first and second slide members in opposite directions such that, when the first slide member is in its extended position, the second slide member is in its retracted position, and when the second slide member is in its extended position, the first slide member is in its retracted position.

2. A door entry system according to claim 1, wherein said first slide member moves to its respective extended position simultaneously with said second slide member moving to its respective retracted position.

3. A door entry system according to claim 1, wherein said first slide member moves to its respective retracted position simultaneously with said second slide member moving to its respective extended position.

4. A door entry system according to claim 1, wherein said first slide member engages with a dead latch bolt when in its respective extended position.

5. A door entry system according to claim 1, wherein said second slide member engages with a dead latch bolt and a spring latch bolt when in its respective extended position.

6. The door entry system according to claim 1, further comprising:

control means for controlling operation of the door entry system.

7. The door entry system according to claims 1, wherein the drive is a motor that rotates a gear, said gear being engaged with a first rack connected to the first sliding member and a second rack connected to the second sliding member.

8. The door entry system according to claim 1, wherein the drive is a motor that rotates a cam member, said cam member alternately engaging with a first cam surface on the first sliding member and a second cam surface on the second sliding member to thereby effect movement of the same.

9. The door entry system according to claim 1, wherein the opening is arranged to receive a spring latch bolt when the second sliding member is removed therefrom.

10. The door entry system according to claim 1, wherein the opening is arranged to receive a dead latch bolt when the first sliding member is removed therefrom.

11. A door entry system comprising:

a first member movable between an engaged position and a disengaged position such that, in its engaged position, an end of the first member is positioned in an opening, and in its disengaged position, the end of the first member is positioned out of the opening;

a second member movable between an engaged position and a disengaged position such that, in its engaged position, an end of the second member is positioned in the opening, and in its disengaged position, the end of the second member is positioned out of the opening; and, a selectively activated drive which effects movement of the first and second members, said first and second members moving to opposite engaged and disengaged positions with each activation of the drive.

12. The door entry system according to claim 11, wherein the end of the second member has a cross-section that spans substantially an entire dimension of the opening.

13. The door entry system according to claim 12, wherein the dimension is the opening's width, said width being measured along a direction normal to an axis about which a door associated with the door entry system swings.

14. The door entry system according to claim 11, wherein the ends of the first and second members have cross-sections that combined substantially match an entire cross-section of the opening.

15. The door entry system according to claim 11, wherein said drive simultaneously moves the first and second members.

16. The door entry system according to claim 15, wherein the drive is a motor that rotates a gear, said gear being engaged with a first rack connected to the first member and a second rack connected to the second member such that rotation of the gear slides the first and second members in opposite directions.

17. The door entry system according to claim 11, wherein the drive is a motor that rotates a cam member, said cam member engaging with a first cam surface on the first member and a second cam surface on the second member to thereby move the same.

18. The door entry system according to claim 17, wherein as the cam member is rotated it alternately engages with the first and second cam surfaces one at a time such that one of the first and second members corresponding to the cam surface engaged by the cam member is moved in a first direction, and the other of the first and second members corresponding to the cam surface not engaged by the cam member is freed to move in a second direction opposite the first direction.

19. A door entry system according to claim 11, further comprising:

control means for controlling operation of the door entry system; and, a deadbolt assembly including:

a deadbolt member movable between an extended and retracted position; and, a deadbolt drive which moves the deadbolt member between the extended and retracted positions.

20. A door entry system according to claim 19, wherein said control means selectively causes said deadbolt member to move into its extended position, and said first member to move into its engaged position to put an associated door in a locked condition.

21. A door entry system according to claim 19, wherein said control means selectively causes said deadbolt member to move into its retracted position and said second member to move into its engaged position to put an associated door in an unlocked condition.

22. A door entry system according to claim 19, further comprising:

a first housing means which houses the first and second members and the drive therefor, wherein said first housing means includes a first electrical interface means.

23. A door entry system according to claim 19, wherein said control means includes:

transmitter means for transmitting control signals;

receiver means for receiving said control signals and operating said door entry system in accordance with said control signals.

24. A door entry system according to claim 19, wherein said deadbolt member includes a switch means, said switch means conveying a signal to said control means to effect movement of said deadbolt member to a retracted position when said switch means is activated.

25. A door entry system according to claim 24, wherein said control means effects movement of said first member to a disengaged position and said second member to an engaged position in response to receipt of said signal.

26. A door entry system according to claims 24, wherein said system further comprises a deadbolt bolt lever body housing means dimensioned to receive said deadbolt member.

27. A door entry system according to claim 26, wherein said deadbolt bolt lever body housing means includes a bolt section movable between an extended and a retracted position, wherein said bolt section engages with said switch means in the extended position to activate said switch means.

28. A door entry system according to claim 22, further comprising:

a second housing means which houses the deadbolt assembly, wherein said second housing means includes a second electrical interface means.

29. A door entry system according to claim 28, wherein the first and second housing means are joined together such that said first electrical interface means is connected with said second electrical interface means to provide an electrically conductive path therebetween.

30. A door entry system according to claim 28, further comprising:

connection means, said connection means including a cable having connectors at both ends thereof, said connectors being connected to the first and second electrical interface means to thereby provide an electrically conductive path between the first and second housing means.

31. A door entry system according to claim 28, wherein said second housing means is locatable at a selectable offset distance from said first housing means.

32. A door entry system according to claim 28, wherein said system further comprises a portable energy unit, said portable energy unit comprising:

battery means for providing an electrical power supply; and third housing means for housing said battery means.

33. A door entry system according to claim 32, wherein said third housing means includes a third electrical interface means for interfacing with at least one of the first and second electrical interface means.

* * * * *